(12) United States Patent
Seo et al.

(10) Patent No.: US 10,635,295 B2
(45) Date of Patent: Apr. 28, 2020

(54) DEVICE INCLUDING PLURALITY OF TOUCH SCREENS AND SCREEN CHANGE METHOD FOR THE DEVICE

(75) Inventors: Joon-Kyu Seo, Gyeonggi-do (KR); Kyung-A Kang, Seoul (KR); Ji-Yeon Kwak, Seoul (KR); Ju-Youn Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/370,939

(22) Filed: Feb. 10, 2012

(65) Prior Publication Data

US 2012/0242599 A1 Sep. 27, 2012

Related U.S. Application Data

(60) Provisional application No. 61/441,491, filed on Feb. 10, 2011.

(30) Foreign Application Priority Data

Jul. 11, 2011 (KR) .................. 10-2011-0068316

(51) Int. Cl.
*G06F 3/0488* (2013.01)
*G06F 3/0484* (2013.01)
(Continued)

(52) U.S. Cl.
CPC ........ *G06F 3/04883* (2013.01); *G06F 1/1641* (2013.01); *G06F 1/1643* (2013.01);
(Continued)

(58) Field of Classification Search
CPC .... G06F 1/1643; G06F 3/0485; G06F 3/1423; G06F 1/1616; G06F 3/04845;
(Continued)

(56) References Cited

U.S. PATENT DOCUMENTS 6,396,506 B1 5/2002 Hoshino et al.
6,545,669 B1 4/2003 Kinawi et al.
(Continued)

FOREIGN PATENT DOCUMENTS

CN 101676853 3/2010
CN 101853122 10/2010
(Continued)

OTHER PUBLICATIONS

Japanese Office Action dated Feb. 8, 2016 issued in counterpart application No. 2013-553370, 6 pages.
(Continued)

*Primary Examiner* — Patrick N Edouard
*Assistant Examiner* — Douglas M Wilson
(74) *Attorney, Agent, or Firm* — The Farrell Law Firm, P.C.

(57) ABSTRACT

A screen change method and device are provided. A first screen, from among a plurality of screens, is displayed on a first touch screen. A second screen, which precedes or succeeds the first screen in a sequence of the plurality of screens, is displayed on a second touch screen. A touch is detected on the first touch screen. Continuous movement of the detected touch from the first touch screen to the second touch screen is detected. Other screens, which are different from the first screen and the second screen, from among the plurality of screens, are displayed on the first touch screen and the second touch screen, in response to the detected continuous movement of the touch.

14 Claims, 11 Drawing Sheets

(51) Int. Cl.
*G06F 1/16* (2006.01)
*G06F 3/14* (2006.01)
*G06F 3/0485* (2013.01)
*G06F 3/0486* (2013.01)

(52) U.S. Cl.
CPC .......... *G06F 1/1647* (2013.01); *G06F 3/0485* (2013.01); *G06F 3/0486* (2013.01); *G06F 3/04845* (2013.01); *G06F 3/04847* (2013.01); *G06F 3/1423* (2013.01); *G06F 2203/04806* (2013.01)

(58) Field of Classification Search
CPC .. G06F 3/04883; G06F 1/1641; G06F 1/1694; G06F 2200/1614; G06F 2203/04808; H04N 1/00411; H04N 1/00453; H04M 2250/12

See application file for complete search history.

(56) References Cited

U.S. PATENT DOCUMENTS

| | | | |
|---|---|---|---|
| 8,473,870 B2* | 6/2013 | Hinckley | G06F 3/0416 345/173 |
| 8,922,494 B2 | 12/2014 | Min et al. | |
| 9,047,046 B2 | 6/2015 | Kii | |
| 2002/0033795 A1 | 3/2002 | Shahoian et al. | |
| 2008/0297484 A1 | 12/2008 | Park et al. | |
| 2009/0251432 A1 | 10/2009 | Wang et al. | |
| 2009/0322689 A1 | 12/2009 | Kwong et al. | |
| 2010/0020025 A1 | 1/2010 | Lemort et al. | |
| 2010/0060587 A1 | 3/2010 | Freund | |
| 2010/0066698 A1 | 3/2010 | Seo | |
| 2010/0081475 A1 | 4/2010 | Chiang et al. | |
| 2010/0090971 A1 | 4/2010 | Choi et al. | |
| 2010/0129782 A1 | 5/2010 | Milne et al. | |
| 2010/0182266 A1 | 7/2010 | Kim et al. | |
| 2010/0188352 A1 | 7/2010 | Ikeda | |
| 2010/0295802 A1 | 11/2010 | Lee | |
| 2010/0298032 A1 | 11/2010 | Lee et al. | |
| 2010/0302179 A1 | 12/2010 | Ahn et al. | |
| 2010/0309158 A1 | 12/2010 | Iwayama et al. | |
| 2011/0018821 A1 | 1/2011 | Kii | |
| 2011/0063191 A1 | 3/2011 | Leung et al. | |
| 2011/0090155 A1* | 4/2011 | Caskey | G06F 1/1641 345/173 |
| 2011/0102349 A1* | 5/2011 | Harris | G06F 3/016 345/173 |
| 2011/0141052 A1* | 6/2011 | Bernstein | G06F 3/016 345/174 |
| 2011/0209102 A1* | 8/2011 | Hinckley | G06F 3/04883 715/863 |
| 2011/0209103 A1* | 8/2011 | Hinckley | G06F 3/0416 715/863 |
| 2012/0081277 A1* | 4/2012 | de Paz | G06F 3/04883 345/156 |
| 2012/0084721 A1* | 4/2012 | Gimpl | G06F 1/1641 715/800 |
| 2012/0127109 A1* | 5/2012 | Nishio | G06F 3/04883 345/173 |
| 2012/0130712 A1 | 5/2012 | Shin et al. | |

FOREIGN PATENT DOCUMENTS

| | | | |
|---|---|---|---|
| CN | 101866263 | 10/2010 | |
| CN | 102187303 | 9/2011 | |
| EP | 2 228 707 | 9/2010 | |
| EP | 2 241 962 | 10/2010 | |
| GB | 2485842 | 5/2012 | |
| JP | 11-073269 | 3/1999 | |
| JP | 2003-280622 | 10/2003 | |
| JP | WO 2010/016627 A1 * | 8/2009 | ............ G06F 3/041 |
| JP | 2010-129092 | 6/2010 | |
| JP | 2010-176332 | 8/2010 | |
| JP | 2010-250465 | 11/2010 | |
| JP | 2010-286911 | 12/2010 | |
| JP | WO 2011013400 A1 * | 2/2011 | ......... G06F 3/04883 |
| KR | 1020000064572 | 11/2000 | |
| KR | 1020040057314 | 7/2004 | |
| KR | 10-0887778 | 3/2009 | |
| KR | 1020090120549 | 11/2009 | |
| KR | 1020100014876 | 2/2010 | |
| KR | 1020100032660 | 3/2010 | |
| KR | 1020100069434 | 6/2010 | |
| KR | 1020100082451 | 7/2010 | |
| KR | 1020100104562 | 9/2010 | |
| KR | 1020100108417 | 10/2010 | |
| KR | 1020100128781 | 12/2010 | |
| RU | 2 394 386 | 7/2010 | |
| WO | WO 2011/013400 | 2/2011 | |
| WO | WO-2011013400 A1 * | 2/2011 | ......... G06F 3/04886 |
| WO | WO 2011/047338 | 4/2011 | |
| WO | WO 2011/106466 | 9/2011 | |

OTHER PUBLICATIONS

Russian Office Action dated Feb. 15, 2016 issued in counterpart application No. 2013141408/08, 8 pages.
Chinese Office Action dated Jul. 27, 2015 issued in counterpart application No. 201280008611.X, 17 pages.
European Search Report dated Aug. 10, 2016 issued in counterpart application No. 12744830.6-1959, 7 pages.
Australian Examination Report dated Sep. 16, 2016 issued in counterpart application No. 2012214930, 4 pages.
Australian Examination Report dated Mar. 10, 2017 issued in counterpart application No. 2012214930, 2 pages.
Russian Office Action dated Oct. 13, 2016 issued in counterpart application No. 2013141408/08, 13 pages.
Japanese Office Action dated Nov. 21, 2016 issued in counterpart application No. 2013-553370, 4 pages.
Korean Office Action dated Jun. 21, 2017 issued in counterpart application No. 10-2011-0068316, 13 pages.
Korean Office Action dated Jun. 28, 2017 issued in counterpart application No. 10-2011-0080024, 15 pages.
Korean Office Action dated Nov. 10, 2017 issued in counterpart application No. 10-2012-0012426, 10 pages.
Korean Office Action dated Jul. 24, 2018 issued in counterpart application No. 10-2012-0066401, 7 pages.
Korean Office Action dated Sep. 5, 2019 issued in counterpart application No. 10-2019-0071540, 9 pages.
Indian Examination Report dated Sep. 18, 2019 issued in counterpart application No. 7024/CHENP/2013, 6 pages.
Chinese Office Action dated Jun. 21, 2019 issued in counterpart application No. 201710259720.3, 17 pages.
KR Decision of Grant dated Jun. 28, 2019 issued in counterpart application No. 10-2012-0012449, 6 pages.

* cited by examiner

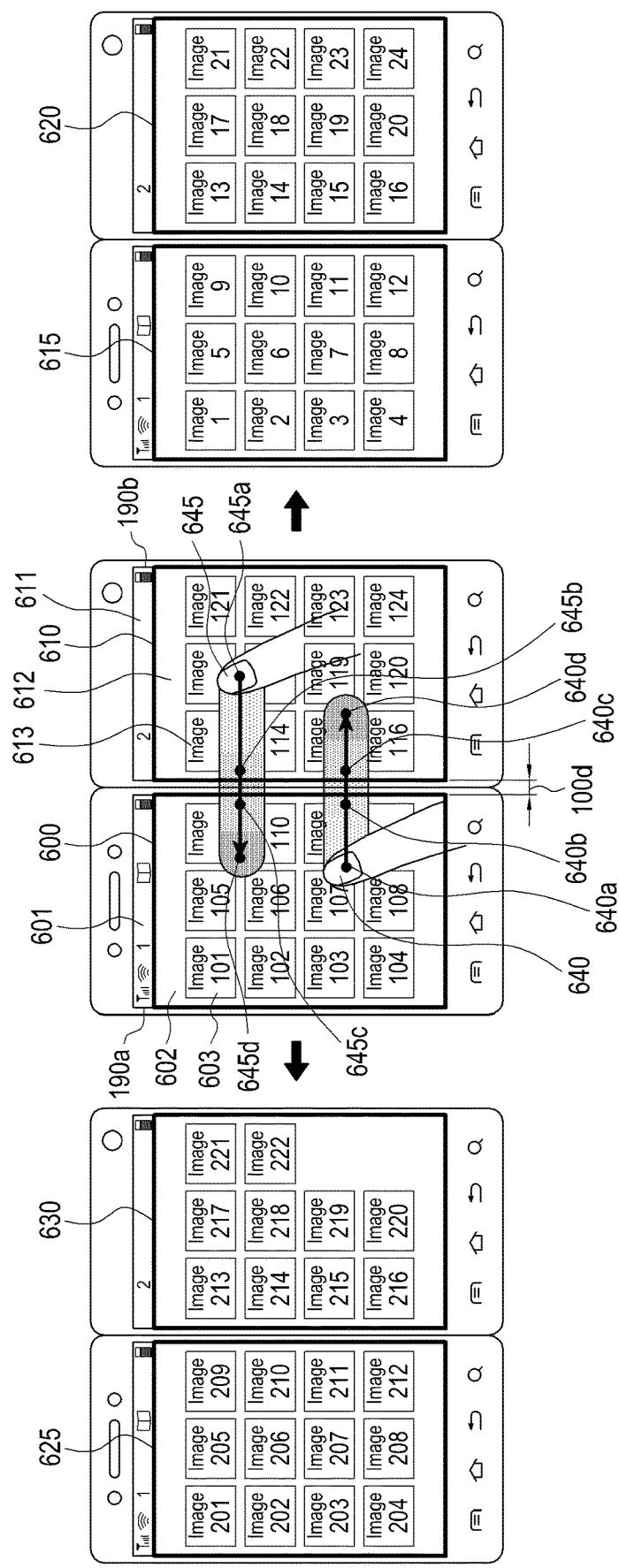

DEVICE INCLUDING PLURALITY OF TOUCH SCREENS AND SCREEN CHANGE METHOD FOR THE DEVICE

PRIORITY

This application claims priority under 35 U.S.C. § 119(a) to a U.S. Provisional Application filed in the United States Patent and Trademark Office on Feb. 10, 2011 and assigned Ser. No. 61/441,491, and to a Korean Patent Application filed in the Korean Intellectual Property Office on Jul. 11, 2011 and assigned Serial No. 10-2011-0068316, the entire disclosures of which are incorporated herein by reference.

BACKGROUND OF THE INVENTION

1. Field of the Invention

The present invention relates generally to a device including a plurality of touch screens and a screen change method for the device, and more particularly, to a device that includes a plurality of touch screens that change displayed screens in response to continuous movement of a touch and a screen change method for the device.

2. Description of the Related Art

A desktop computer has at least one display device, such as, for example, a monitor. A mobile device that implements a touch screen, such as, for example, a cellular phone, a smart phone, and a tablet Personal Computer (PC), has one display device.

A user of the desktop computer may divide a screen of the display device horizontally or vertically in order to work with a plurality of displayed windows. When a web browser is executed, movement may be made upward or downward on the web page by using a page-up button or a page-down button provided on a keyboard. When a mouse is used in place of the keyboard, movement may be made upward or downward on the web page by selecting a scroll bar at a side on the web page with a cursor of the mouse. By selecting a top button indicated by a text or an icon in a bottom portion of the web page, movement may be made to a top portion of the web page.

The mobile device, when compared to the desktop computer, has a smaller screen size and thus, the mobile device is more limited in its input operations. As a result, the screen of the mobile device is difficult to divide. Moreover, in the mobile device, several touch gestures, such as flicks, are necessary for movement to the bottom of a long web page.

SUMMARY OF THE INVENTION

The present invention has been made to address at least the above problems and/or disadvantages and to provide at least the advantages described below. Accordingly, an aspect of the present invention is to provide a device including a plurality of touch screens, which can, in response to continuous movement of a touch starting from a first touch screen to a second touch screen, change a first screen and a second screen into other screens among the plurality of screens, and a screen change method for the device.

According to an aspect of the present invention, a screen change method is provided for a device having a plurality of touch screens. A first screen, from among a plurality of screens, is displayed on a first touch screen. A second screen, which precedes or succeeds the first screen in a sequence of the plurality of screens, is displayed on a second touch screen. A touch is detected on the first touch screen. Continuous movement of the detected touch from the first touch screen to the second touch screen is detected. Other screens, which are different from the first screen and the second screen, from among the plurality of screens, are displayed on the first touch screen and the second touch screen, in response to the detected continuous movement of the touch.

According to another aspect of the present invention, a screen change method is provided for a device having a plurality of touch screens. A first home screen, from among a plurality of home screens, is displayed on a first touch screen. A second home screen, which precedes or succeeds the first home screen in a sequence of the plurality of home screens, is displayed on a second touch screen. A touch is detected on the first touch screen. Continuous movement of the detected touch from the first touch screen to the second touch screen is detected. Other home screens, which are different from the first home screen and the second home screen, from among the plurality of home screens, are displayed on the first touch screen and the second touch screen, in response to the detected continuous movement of the touch.

According to another aspect of the present invention, a screen change method is provided for a device having a plurality of touch screens. Two continuous screens, among a sequence of a plurality of screens, are displayed on a first touch screen and a second touch screen, respectively. A touch is detected on the first touch screen. A touch gesture, including continuous movement of the detected touch from the first touch screen to the second touch screen, is detected. Other two screens, from among the plurality of screens, are displayed on the first touch screen and the second touch screen in response to the detected touch gesture.

According to another aspect of the present invention, a device is provided that includes a first touch screen for displaying a first screen, from among a plurality of screens, and a second touch screen for displaying a second screen, which precedes or succeeds the first screen in a sequence of the plurality of screens. The devices also includes a controller for controlling the first touch screen and the second touch screen. The controller detects continuous movement of a touch, detected on the first touch screen, from the first touch screen to the second touch screen, and displays other screens, which are different from the first screen and the second screen, from among the plurality of screens, on the first touch screen and the second touch screen, in response to the detected continuous movement of the touch.

According to another aspect of the present invention, a device is provided that includes a first touch screen for displaying a first home screen, from among a plurality of home screens, and a second touch screen for displaying a second home screen, which precedes or succeeds the first home screen in a sequence of the plurality of home screens. The device also includes a controller for controlling the first touch screen and the second touch screen. The controller detects continuous movement of a touch, detected on the first touch screen, from the first touch screen to the second touch screen, and displays other home screens, which are different from the first home screen and the second home screen, from among the plurality of home screens, on the first touch screen and the second touch screen, in response to the detected continuous movement of the touch.

BRIEF DESCRIPTION OF THE DRAWINGS

The above and other aspects, features and advantages of the present invention will be more apparent from the following detailed description when taken in conjunction with the accompanying drawings, in which:

FIGS. 6A through 6C are diagrams illustrating screen change methods for a device, according to an embodiment of the present invention;

DETAILED DESCRIPTION OF EMBODIMENTS OF THE PRESENT INVENTION

Figure 1:
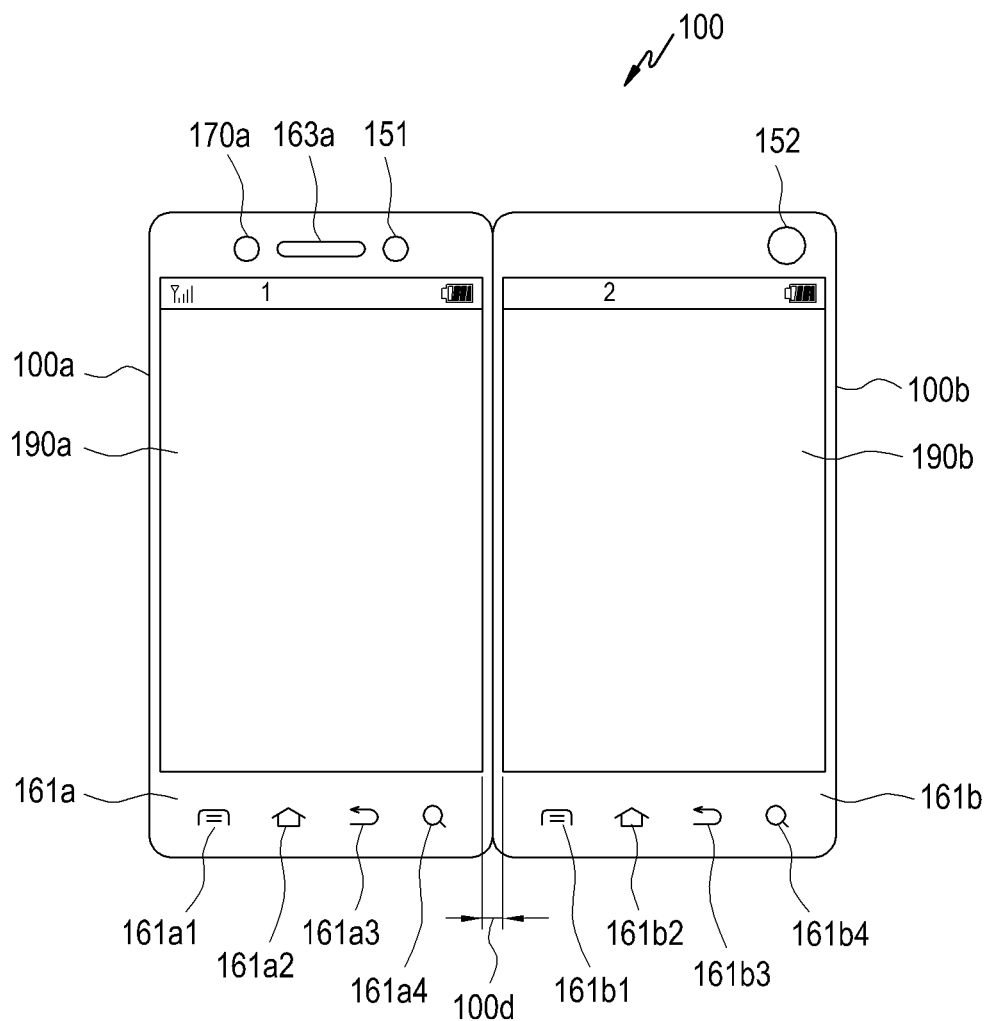
FIG. 1 is a schematic diagram illustrating a device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a schematic diagram illustrating a device, according to an embodiment of the present invention.

Referring to FIG. 1, a device 100 including a plurality of touch screens may include a first housing 100a and a second housing 100b, the sides of which are connected to each other by means of a hinge or flexible plastic. A first touch screen 190a and a second touch screen 190b are disposed side-by-side on respective central portions of front faces of the opened first housing 100a and second housing 100b. The first touch screen 190a and the second touch screen 190b are spaced apart from each other by an interval 100d.

On an upper portion of the front face of the first housing 100a are disposed a first camera 151 for capturing a still image or a video, a proximity sensor 170a for detecting the approach of a user or an object, and a first speaker 163a for outputting voice and/or sound external to the device 100. On a lower portion of the front face of the first housing 100a is disposed a first button group 161a including a single button 161a2, or a plurality of buttons 161a1 through 161a4.

On an upper portion of the front face of the second housing 100b is disposed a second camera 152 for capturing a still image or a video. On a lower portion of the front face of the second housing 100b is disposed a second button group 161b including a single button 161b2, or a plurality of buttons 161b1 through 161b4.

According to the capability of the device 100 shown in FIG. 1, at least one component may be added to or removed from components of the device 100. Positions of the components may be changed according to the capability or structure of the device 100, as can be easily understood by those of ordinary skill in the art.

Figure 2A:
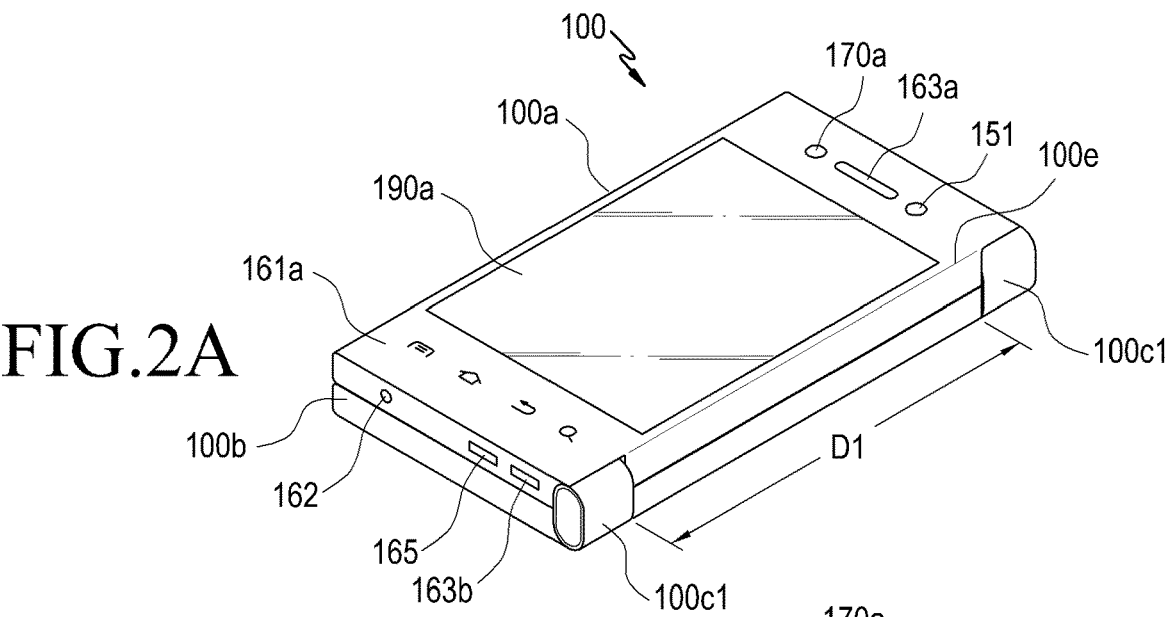
FIGS. 2A through 2C are diagrams illustrating schematic perspective views of a device, according to embodiments of the present invention.
Figure 2B:
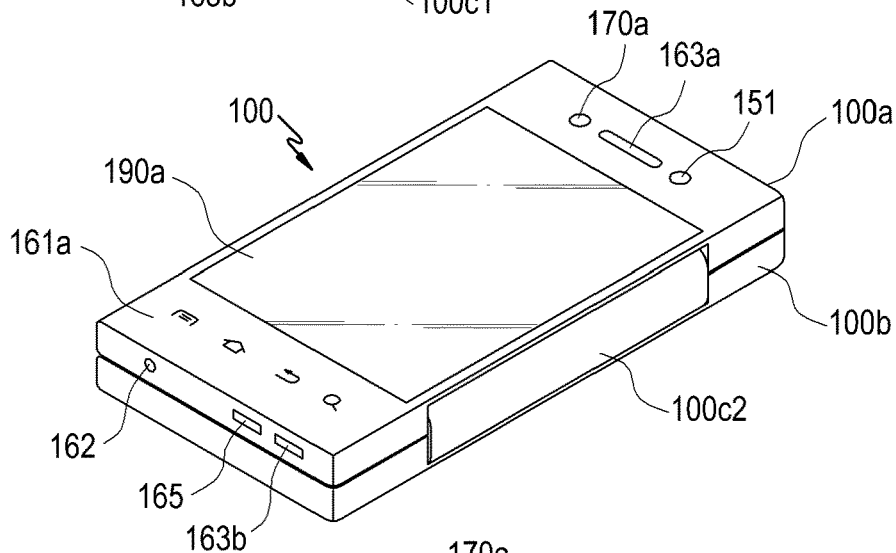
Figure 2C:
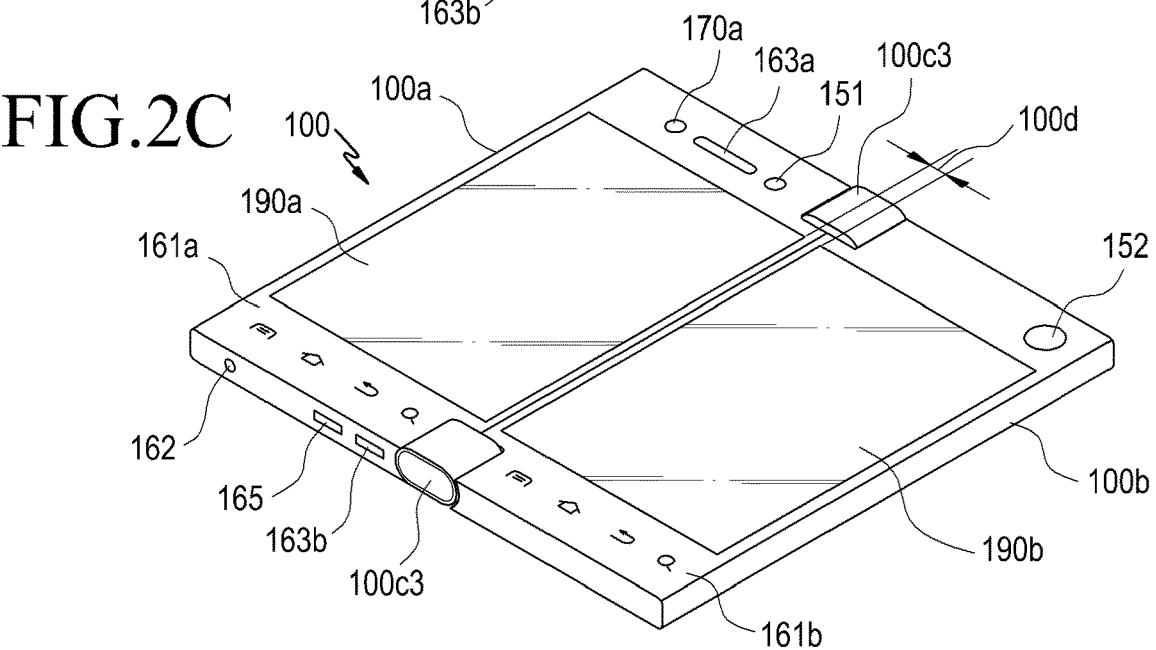

FIGS. 2A through 2C are diagrams illustrating schematic perspective views of the device 100, according to embodiments of the present invention.

In FIGS. 2A and 2B, the first housing 100a and the second housing 100b of the device 100 are in a closed state. In FIGS. 1 and 2C, the first housing 100a and the second housing 100b of the device 100 are in an open state.

Hinge portions 100c1, 100c2, and 100c3 are disposed between the first housing 100a and the second housing 100b to open and close the first and second housings 100a and 100b. The first housing 100a and the second housing 100b may be capable of moving within a predetermined angle, which is in a range between 0° and 220° by means of the hinge portions 100c1, 100c2, and 100c3.

Referring back to FIG. 2A, in the closed state, an angle formed between a rear side of the first housing 100a and a rear side of the second housing 100b is substantially equal to 0°. For example, the rear side of the first housing 100a and the rear side of the second housing 100b are parallel or face each other. The rear side of the first housing 100a and the rear side of the second housing 100b may be disposed such that they contact each other or such that they are spaced apart by a determined interval (e.g., less than 3 mm). In the closed state, the angle formed between the rear side of the first housing 100a and the rear side of the second housing 100b may be less than 5°.

A power/lock button is disposed on an upper side of the first housing 100a, at least one volume button is disposed on a left side of the first housing 100a, and a microphone (MIC), a connector 165, and a second speaker 163b are disposed on a lower side of the first housing 100a.

A plurality of hinge portions 100c1 connect both ends of right sides of the first and second housings 100a and 100b, and are separated by an interval D1. In the closed state, a distance from the first touch screen 190a of the device 100 to an edge 100e of the first housing 100a is ½ of the interval 100d.

The first touch screen 190a and the second touch screen 190b are disposed generally in parallel with the both hinge portions 100c1 and in a plane perpendicular to both hinge portions 100c1. As shown in FIG. 2A, lengths of the first touch screen 190a and the second touch screen 190b are shorter than the interval D1, but they may also be longer than the interval D1. Touch screens are shown as square shapes in an embodiment of the present invention, but shapes or disposition directions of the touch screens may be varied, as is easily understood by those of ordinary skill in the art.

As shown in FIG. 1, the plurality of hinge portions 100c1 connecting the first housing 100a and the second housing 100b may not be exposed to the front face of the first housing 100a and the front face of the second housing 100b.

Referring back to FIG. 2B, the device 100 may include the first housing 100a, the second housing 100b, and a single hinge portion 100c2. The first housing 100a and the second housing 100b are in the closed state. The hinge portion 100c2 connects intermediate portions of right sides of the closed first and second housings 100a and 100b.

Disposition of the device 100 in terms of an angle, a front face, and a side in FIG. 2B are substantially the same as those shown in FIG. 2A.

As shown in FIG. 1, the hinge portion 100c2 connecting the first housing 100a and the second housing 100b may not be exposed to the front face of the first housing 100a and the front face of the second housing 100b.

Referring back to FIG. 2C, the device 100 includes the first housing 100a, the second housing 100b, and the plurality of hinge portions 100c3. Unlike FIG. 1, the plurality of hinge portions 100c3 connecting the first housing 100a and the second housing 100b are exposed to the front face of the first housing 100a and the front face of the second housing 100b in FIG. 2C.

Disposition of the device 100 in terms of an angle, a front face, and a side in FIG. 2C are substantially the same as those shown in FIGS. 1 and 2A.

As shown in FIG. 2C, the interval 100d is formed between the first housing 100a and the second housing 100b, as in FIG. 1.

The hinge portions 100c1, 100c2, and 100c3 may be dual-axis hinge portions that use a first hinge axis corresponding to the first housing 100a, and a second hinge axis corresponding to the second housing 100b, to pivot the first housing 100a and the second housing 100b.

Figure 3:
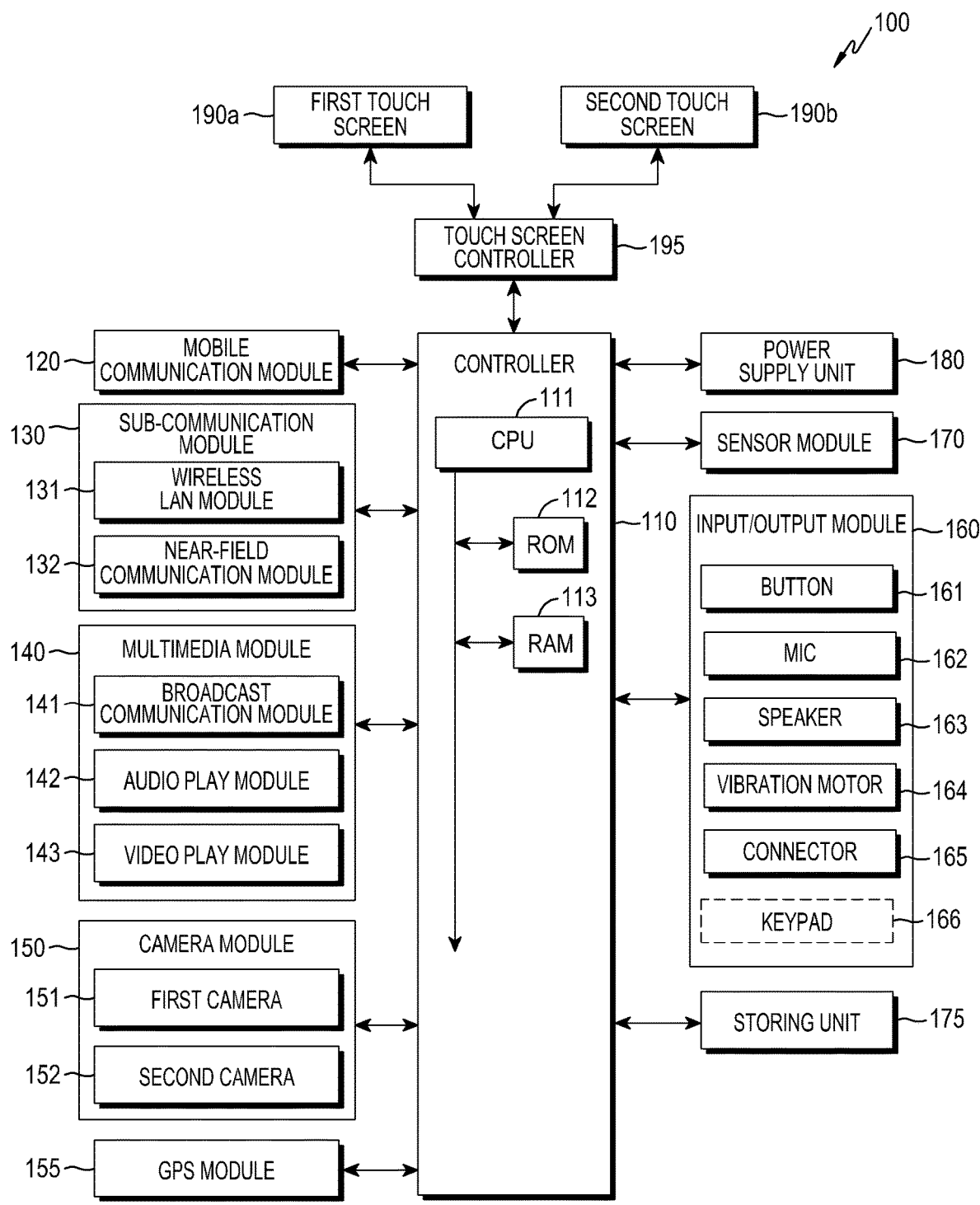
FIG. 3 is a schematic block diagram illustrating a device, according to an embodiment of the present invention.

FIG. 3 is a schematic block diagram illustrating the device 100, according to an embodiment of the present invention.

Referring to FIG. 3, the device 100 may be connected to an external device by using a mobile communication module 120, a sub-communication module 130, and a connector 165. The "external device" may include, for example, another device, a cellular phone, a smart phone, a tablet PC, or a server.

The device 100 includes the first touch screen 190a, the second touch screen 190b, and a touch screen controller 195. The device 100 includes a controller 110, the mobile communication module 120, the sub-communication module 130, a multimedia module 140, a camera module 150, a Global Positioning System (GPS) module 155, an input/output module 160, a sensor module 170, a storing unit 175, and a power supplying unit 180. The sub-communication module 130 may include at least one of a wireless Local Area Network (LAN) module 131 and a near field communication module 132. The multimedia module 140 may include at least one of a broadcast communication module 141, an audio play module 142, and a video play module 143. The camera module 150 may include at least one of a first camera 151 and a second camera 152. The input/output module 160 may include at least one of a button 161, the MIC 162, a speaker 163, a vibration motor 164, the connector 165, and a keypad 166.

The controller 110 includes a Central Processing Unit (CPU) 111, a Read Only Memory (ROM) 112 having stored therein a control program for controlling the device 100, and a Random Access Memory (RAM) 113 for storing a signal or data input from outside the device 100 or serving as a memory region for work performed in the device 100. The CPU 111 may include a single core, dual cores, triple cores, or quad cores. The CPU 111, the ROM 112, and the RAM 113 are connected to one another through an internal bus.

The controller 110 controls the mobile communication module 120, the sub-communication module 130, the multimedia module 140, the camera module 150, the GPS module 155, the input/output module 160, the sensor module 170, the storing unit 175, the power supplying unit 180, the first touch screen 190a, the second touch screen 190b, and the touch screen controller 195.

The mobile communication module 120 allows the device 100 to be connected to the external device through mobile communication by using at least one of or a plurality of antennas under control of the controller 110. The mobile communication module 120 transmits/receives a radio signal for voice communication, video communication, a Short Messaging Service (SMS) message, or a Multimedia Messaging Service (MMS) message to/from a cellular phone, a smart phone, a tablet PC, or another device having a phone number input to the device 100.

The sub-communication module 130 may include at least one of the wireless LAN module 131 and the near field communication module 132.

The wireless LAN module 131 may be connected to the Internet in a place where a wireless Access Point (AP) is installed under control of the controller 110. The wireless LAN module 131 supports a wireless LAN standard IEEE802.11x of the Institute of Electrical and Electronics Engineers (IEEE). The near field communication module 132 may perform near field communication in a wireless manner between the device 100 and an image forming device under control of the controller 110. A near field communication scheme may include, for example, Bluetooth or Infrared Data Association (IrDA).

The device 100 may include at least one of the mobile communication module 120, the wireless LAN module 131, and the near field communication module 132 according to its capability.

The multimedia module 140 may include the broadcast communication module 141, the audio play module 142, and the video play module 143. The broadcast communication module 141 may receive a broadcast signal (e.g., a TV broadcast signal, a radio broadcast signal, or a data broadcast signal) and broadcast additional information (e.g., an Electric Program Guide (EPG) or an Electric Service Guide (ESG)) output from a broadcasting station through a broadcast communication antenna, under control of the controller 110. The audio play module 142 may play a digital audio file (e.g., a file having a file extender of mp3, wma, ogg, or way) stored or received under control of the controller 110. The video play module 143 may play a digital video file (e.g., a file having a file extender of mpeg, mpg, mp4, avi, mov, or mkv) stored or received under control of the controller 110. The video play module 143 may also play a digital audio file.

The multimedia module 140 may include the audio play module 142 and the video play module 143 without the broadcast communication module 141. The audio play module 142 or the video play module 143 of the multimedia module 140 may be included in the controller 110.

The camera module 150 may include at least one of the first camera 151 of the first housing 100a and the second camera 152 of the second housing 100b, which capture a still image or a video under control of the controller 110. The first camera 151 or the second camera 152 may include an auxiliary light source (e.g., a flash) for providing a light intensity necessary for capturing an image. The first camera 151 and the second camera 152 are positioned adjacent to each other (e.g., an interval between the first camera 151 and the second camera 152 is greater than 1 cm and less than 8 cm) to capture a three-dimensional (3D) still image or a 3D video. When the interval between the first camera 151 and the second camera 152 is less than a widthwise length of the first housing 100a (e.g., a length orthogonal to the interval D1), the first camera 151 and the second camera 152 may be disposed in the first housing 100a. When the interval between the first camera 151 and the second camera 152 is greater than the widthwise length of the first housing 100a, the first camera 151 and the second camera 152 may be disposed in the first housing 100a and the second housing 100b, respectively.

The GPS module 155 may receive electric waves from a plurality of GPS satellites and calculate a position of the device 100 by using a time of arrival of the electric waves from the GPS satellite at the device 100.

The input/output module 160 may include at least one of the button 161, the MIC 162, the speaker 163, the vibration motor 164, the connector 165, and the keypad 166.

The button 161 may include the first button group 161a on the lower portion of the front face of the first housing 100a, the second button group 161b on the lower portion of the front face of the second housing 100b, the power/lock button on a side of the upper portion of the first housing 100a or the second housing 100b, and at least one volume button on a left side of the first housing 100a or the second housing 100b.

The first button group 161a is formed on the lower portion of the front face of the first housing 100a, and may include a menu button 161a1, the home button 161a2, a back button 161a3, and a search button 161a4. The second button group 161b is formed on the lower portion of the front face of the second housing 100b, and may include a menu button 161b1, the home button 161b2, a back button 161b3, and a search button 161b4. The first button group 161a may include only the home button 161a2. Likewise, the second button group 161b may include only the home button 161b2.

The MIC 162 may receive voice or sound to generate an electric signal under control of the controller 110. The MIC 162 may be disposed as a single piece or a plurality of pieces in the first housing 100a and the second housing 100b.

The speaker 163 may output sound corresponding to various signals (e.g., a radio signal, a broadcast signal, a digital audio file, a digital video file, or a captured picture) of the mobile communication module 120, the sub-communication module 130, the multimedia module 140, or the camera module 150 external to the device 100, under control of the controller 110. The speaker 163 may output sound corresponding to a function performed by the device 100 (e.g., a button manipulation sound or a ring back tone corresponding to a phone call). At least one speaker 163 may be disposed in a proper position or positions of each of the first housing 100a and the second housing 100b. For example, the speaker 163 may be disposed in one selected between the first housing 100a and the second housing 100b; a plurality of speakers 163a and 163b may be disposed in the first housing 100a and the second housing 100b, respectively; or the plurality of speakers 163a and 163b may be disposed in either the first housing 100a or the second housing 100b.

According to an embodiment of the present invention, the speaker 163 may output sound corresponding to continuous movement of a touch from the first touch screen 190a to the second touch screen 190b. Alternatively, the speaker 163 may output sound corresponding to continuous movement of a touch from the second touch screen 190b to the first touch screen 190a.

The vibration motor 164 may convert an electric signal into mechanical vibration under control of the controller 110. For example, when the device 100 in a vibration mode receives a voice call from another device, the vibration motor 164 operates. The vibration motor 164 may be formed as single piece or plural pieces in the first housing 100a and the second housing 100b. For example, the vibration motor 164 may be disposed in the first housing 100a and the second housing 100b, or separate vibration motors may be disposed in the first housing 100a and the second housing 100b, respectively.

According to an embodiment of the present invention, the vibration motor 164 of the device 100 may operate in response to continuous movement of a touch from the first touch screen 190a to the second touch screen 190b. The vibration motor 164 may also operate in response to continuous movement of a touch from the second touch screen 190b to the first touch screen 190a.

The connector 165 may be used as an interface for connecting the device 100 with an external device or a power source. Through a wired cable connected to the connector 165, data stored in the storing unit 175 of the device 100 may be transmitted to the external device or data may be received from the external device, under control of the controller 110. Through a wired cable connected to the connector 165, power may be input from the power source, or a battery may be charged.

The keypad 166 may receive key input from a user for controlling the device 100. The keypad 166 may include a physical keypad formed in the device 100 or a virtual keypad displayed on the first touch screen 190a and/or the second touch screen 190b. The physical keypad formed in the device 100 may be excluded according to the capability or structure of the device 100.

The sensor module 170 includes at least one sensor for detecting a status of the device 100. For example, the sensor module 170 may include the proximity sensor 170a for detecting an approaching action to the device 100, an ambient light sensor for detecting the amount of ambient light around the device 100, an angular sensor for detecting an angle between the first housing 100a and the second housing 100b, or a motion sensor for detecting a motion of the device 100 (e.g., rotation of the device 100 or acceleration or vibration applied to the device 100). At least one sensor may detect a status of the device 100, generate a signal corresponding to the detection, and transmit the signal to the controller 110. According to the capability of the device 100, sensors may be added to or removed from the sensor module 170.

The storing unit 175 may store a signal or data input/output according to an operation of the mobile communication module 120, the sub-communication module 130, the multimedia module 140, the camera module 150, the GPS module 155, the input/output module 160, the sensor module 170, the first touch screen 190a or the second touch screen 190b, under control of the controller 110. The storing unit 175 may store a control program for controlling operations of the device 100 or the controller 110.

The term "storing unit" may include the storing unit 175, the ROM 112 or the RAM 113 included in the controller 110, or a memory card mounted in the device 100, such as a Secure Digital (SD) card or a memory stick. The storing unit may include a non-volatile memory, a volatile memory, a Hard Disk Drive (HDD), or a Solid State Drive (SSD).

The power supply unit 180 may supply power to one battery or a plurality of batteries disposed in the first housing 100a and/or the second housing 100b, under control of the controller 110. The one battery or the plurality of batteries supplies or supply power to the device 100. The power supply unit 180 may supply power input from an external power source to the device 100 through a wired cable connected to the connector 165.

The first touch screen 190a and the second touch screen 190b may provide a User Interface (UI) corresponding to various services (e.g., phone call, data transmission, broadcasting, photographing, and so forth) to the user. The first touch screen 190a and the second touch screen 190b may transmit an analog signal corresponding to at least one touch input to the UI to the touch screen controllers 195, 195a, and 195b. The first touch screen 190a and the second touch screen 190b may receive at least one touch generated by a user's body (e.g., fingers) or an object capable of generating a touch (e.g., a stylus pen). The first touch screen 190a and the second touch screen 190b may receive continuous movement of a touch. The first touch screen 190a and the second touch screen 190b may transmit an analog signal corresponding to continuous movement of an input touch to the touch screen controller 195.

In an embodiment of the present invention, a touch may include a non-contact, when, for example, a detectable interval between the first touch screen 190a or the second touch screen 190b and the user's body or the touchable object is less than 1 mm, The interval detectable on the first touch screen 190a and the second touch screen 190b may change according to the capability or structure of the device 100.

The first touch screen 190a and the second touch screen 190b may be implemented with, for example, a resistive scheme, a capacitive scheme, an infrared scheme, or an acoustic wave scheme.

The touch screen controller 195 converts an analog signal received from the first touch screen 190a and the second touch screen 190b into a digital signal (e.g., X and Y coordinates), and transmits the digital signal to the controller 110. The controller 110 may control the first touch screen 190a and the second touch screen 190b by using the digital signal received from the touch screen controller 195. For example, the controller 110 may cause a short-cut icon displayed on the first touch screen 190a and the second touch screen 190b to be selected or executed in response to a touch. The touch screen controller 195 may be included in the controller 110.

Figure 4:
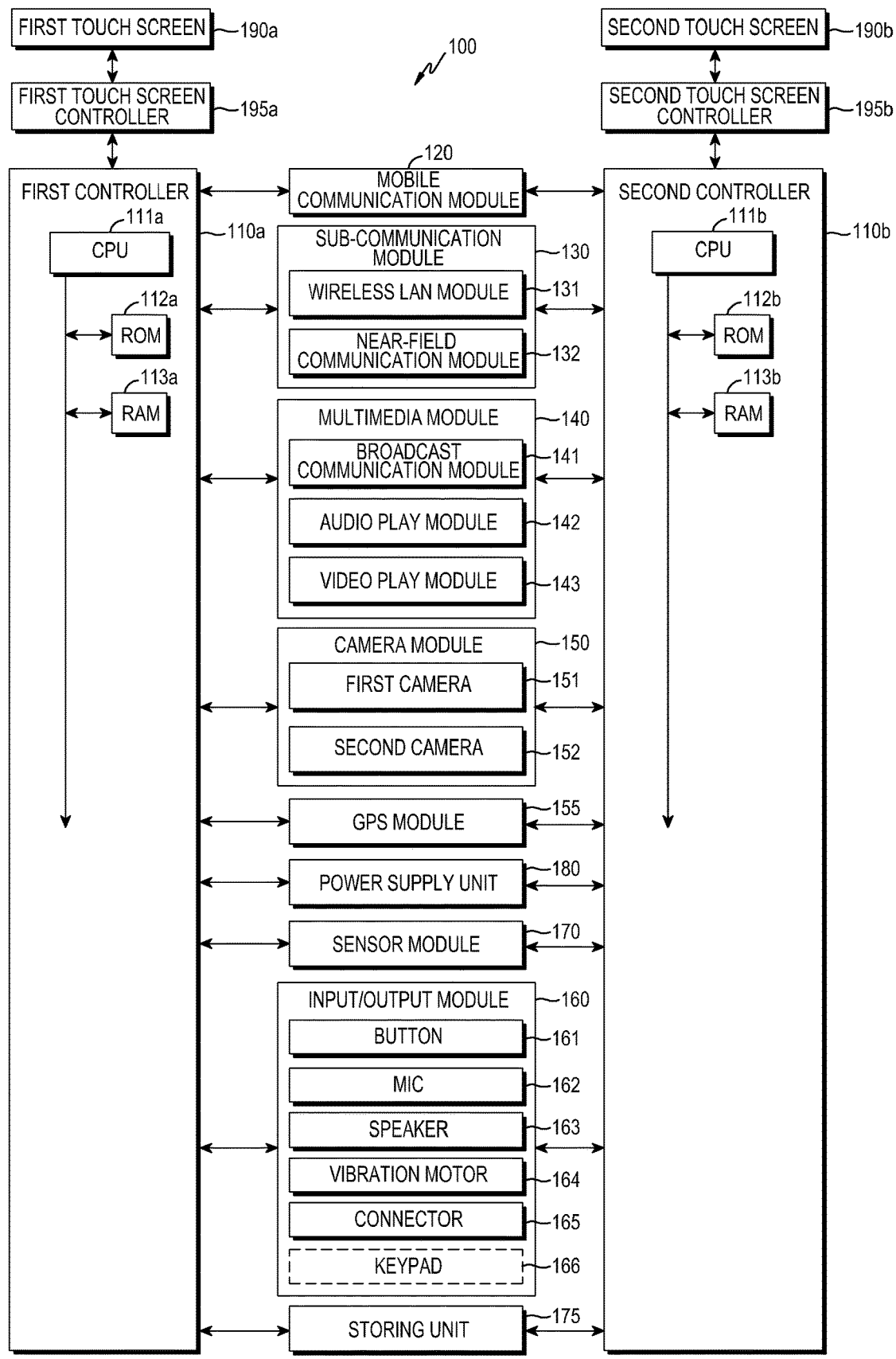
FIG. 4 is a schematic block diagram illustrating a device, according to another embodiment of the present invention.

FIG. 4 is a schematic block diagram illustrating the device 100, according to another embodiment of the present invention.

Referring to FIG. 4, components of the device 100 are the same as those shown in FIG. 3, with the exception of a first controller 110a, a second controller 110b, the first touch screen controller 195a, and the second touch screen controller 195b.

The first controller 110a includes a CPU 111a, a ROM 112a having stored therein a control program for controlling the device 100, and a RAM 113a for storing a signal or data input from outside the device 100 or serving as a memory region for a work performed in the device 100.

The first controller 110a may control the mobile communication module 120, the sub-communication module 130, the multimedia module 140, the camera module 150, the GPS module 155, the input/output module 160, the sensor module 170, the storing unit 175, the power supply unit 180, the first touch screen 190a, and the first touch screen controller 195a.

The first touch screen controller 195a converts an analog signal received from the first touch screen 190a into a digital signal (e.g., X and Y coordinates), and transmits the digital signal to the first controller 110a. The first controller 110a controls the first touch screen 190a by using a digital signal received from the first touch screen controller 195a. The first touch screen controller 195a may be included in the first controller 110a.

The second controller 110b includes a CPU 111b, a ROM 112b having stored therein a control program for controlling the device 100, and a RAM 113b for storing a signal or data input from outside the device 100 or serving as a memory region for a work performed in the device 100.

The second controller 110b may control the mobile communication module 120, the sub-communication module 130, the multimedia module 140, the camera module 150, the GPS module 155, the input/output module 160, the sensor module 170, the storing unit 175, the power supply unit 180, the second touch screen 190b, and the second touch screen controller 195b.

The second touch screen controller 195b converts an analog signal received from the second touch screen 190b into a digital signal (e.g., X and Y coordinates) and transmits the digital signal to the second controller 110b. The second controller 110b controls the second touch screen 190b by using the digital signal received from the second touch screen controller 195b. The second touch screen controller 195b may be included in the second controller 110b.

In an embodiment of the present invention, the first controller 110a may control at least one component that can be disposed in the first housing 100a where the first controller 110a is disposed (e.g., the first touch screen 190a, the first touch screen controller 195a, the mobile communication module 120, the sub-communication module 130, the multimedia module 140, the first camera 151, the GPS module 155, the first button group 161a, the power/lock button, at least one volume button, the sensor module 170, the storing unit 175, and the power supply unit 180).

The second controller 110b may control at least one component that can be disposed in the second housing 100b where the second controller 110b is disposed (e.g., the second touch screen 190b, the second touch screen controller 195b, the second camera 152, the second button group 161b, the storing unit 175, and the power supply unit 180).

In another embodiment of the present invention, the first controller 110a and the second controller 110b may control the components of the device 100 in units of modules. For example, the first controller 110a controls the mobile communication module 120, the sub-communication module 130, and the input/output module 160; and the second controller 110b controls the multimedia module 140, the camera module 150, the GPS module 155, and the sensor module 170. The first controller 110a and the second controller 110b may control the components of the device 100, according to priority. For example, the first controller 110a gives priority to the mobile communication module 120, and the second controller 110b gives priority to the multimedia module 140. While the first controller 110a and the second controller 110b are separated, they may be disposed only in the first housing 110a. The first controller 110a and the second controller 110b may be implemented in a single controller having a CPU with multi-cores, such as, for example, dual cores.

Figure 11A:
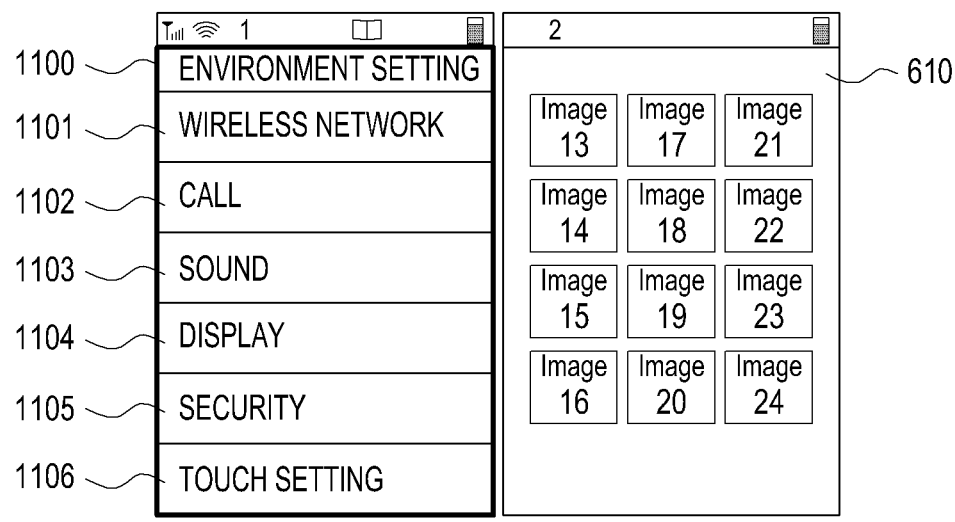
FIGS. 11A and 11B are diagrams illustrating examples of touch setting, according to an embodiment of the present invention.
Figure 11B:
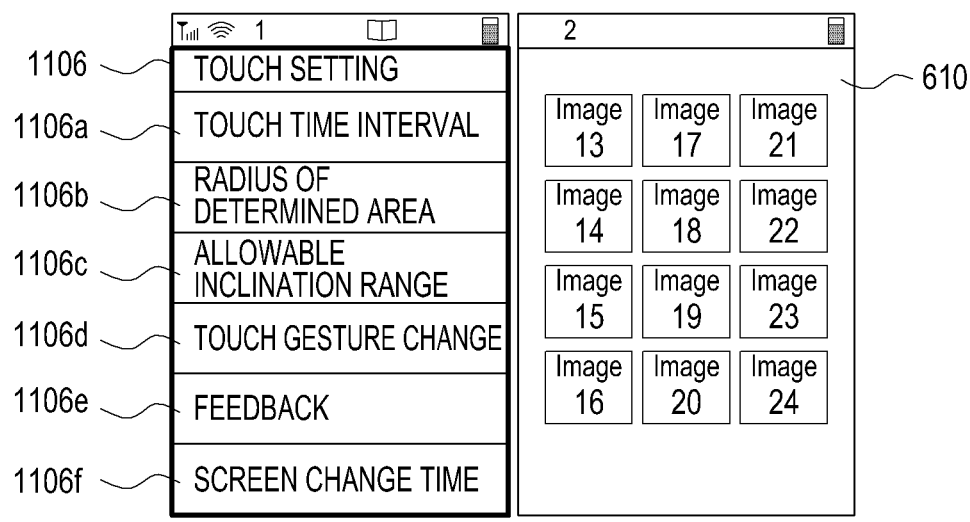

Referring to FIGS. 11A and 11B, the priorities of the first controller 110a and the second controller 110b may be changed using a Controller Priority item of an Environment Setting 1100. For example, the first controller 110a gives priority to the mobile communication module 120.

Referring to FIGS. 1 through 4, the first touch screen 190a is disposed on the first housing 100a and the second touch screen 190b is disposed on the second housing 100b, but both the first touch screen 190a and the second touch screen 190b may be disposed on a single housing. An interval may be formed on the single housing between the first touch screen 190a and the second touch screen 190b.

The single housing may include a flexible housing which is easy to bend. The flexible housing may include a flexible display. A plurality of components, from among the components 110 through 195 shown in FIGS. 3 and 4, may be formed in the flexible housing or the flexible display. A first display area corresponding to the first touch screen 190a, a second display area corresponding to the second touch screen 190b, and an interval corresponding to the interval 100d, may be formed in the flexible display.

The components of the flexible display are substantially identical to those of the device 100.

Figure 5:
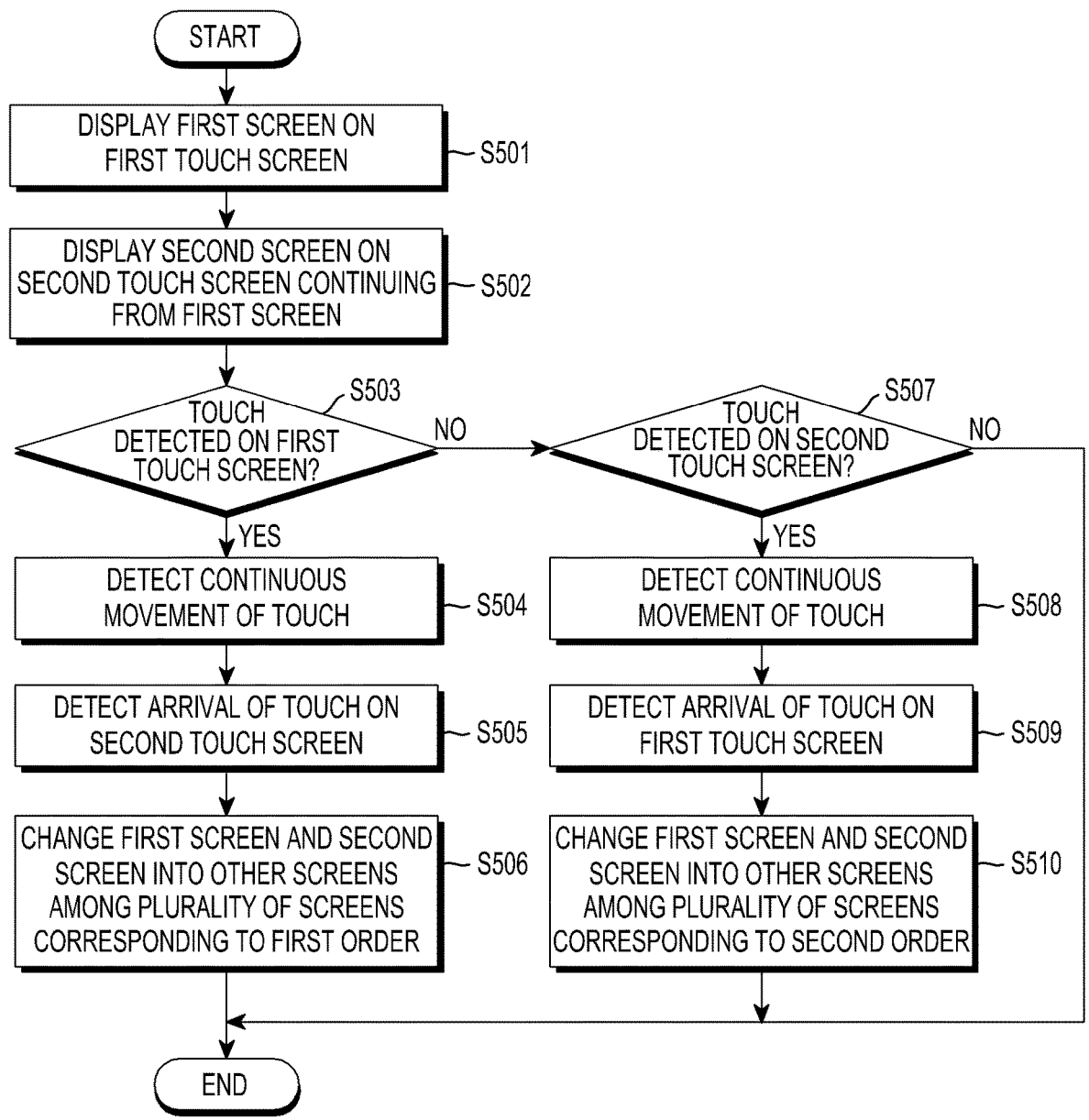
FIG. 5 is a schematic flowchart illustrating a screen change method for a device, according to an embodiment of the present invention.

FIG. 5 is a schematic flowchart illustrating a screen change method for a device, according to an embodiment of the present invention.

Referring to FIG. 5, in step S501, a first screen is displayed on a first touch screen.

FIGS. 6A through 6C are diagrams illustrating a screen change method for a device, according to an embodiment of the present invention.

Referring to FIG. 6B, a first screen 600 and a status bar 601 indicating a charge status of a battery, a strength of a received signal of a cellular phone, or a dual-mode icon are displayed on the first touch screen 190a. The dual-mode icon is one of a text and an icon, which indicates whether the plurality of touch screens 190a and 190b of the device 100 operate. The first screen 600 includes a first display area 602 which displays a title bar expressing a name of an application, such as, for example, a photo album application, executed in the device 100, and at least one image 603 (e.g., images 101 through 112) stored in a storing unit of the device 100 or a folder including the at least one image 603, according to the photo-album application. The first screen 600 is one of a plurality of screens which display the at least one image 603 provided by the photo-album application or the folder. According to the number of folders or the images 603 displayed on the first display area 602, the number of screens provided by the photo-album application may be changed. According to an Operating System (OS) or an application of the device 100, the title bar may not be displayed on the first screen 600. When the title bar is not displayed, as in FIG. 6B, the first screen 600 means the first display area 602. According to an OS or an application of the device 100, the status bar 601 may not be displayed on the first touch screen 190a. When the status bar 601 is not displayed, the first touch screen 190a may display only the first screen 600. The application of the device 100 may include, for example, a messenger program, a word processor, a spread program, a presentation program, a web browser, or a Social Networking Service (SNS) program. The application of the device 100 may include an application and a widget, which are downloaded in the on-line market or provided by a manufacturer. When a friend list or a time line provided by the messenger program is longer than the widthwise length or lengthwise length of the first touch screen 190a and the second touch screen 190b, it may be provided on a plurality of screens. When a page provided by the word processor, the spreadsheet program, and the presentation program is longer than the widthwise length or lengthwise length of the first touch screen 190a and the second touch screen 190b, it may be provided on a plurality of screens. When a web page currently displayed on the web browser is longer than the widthwise length or lengthwise length of the first touch screen 190a and the second touch screen 190b, the single web page may be divided to fit the length of the first touch screen 190a and the second touch screen 190b and provided on a plurality of screens. When the time line in the SNS program is longer than the widthwise length or lengthwise length of the first touch screen 190a and the second touch screen 190b, it may be provided on a plurality of screens. Applications providing the plurality of screens are not limited and may be changed. Examples of applications providing the plurality of screens may be easily understood by those of ordinary skill in the art.

In step S502 of FIG. 5, a second screen continuing from the first screen is displayed on a second touch screen.

Referring to FIG. 6B, a second screen 610 and a status bar 611 indicating the status of the device 100 are displayed on the second touch screen 190b. The second screen 610 may include a second display area 612 which displays a title bar expressing a name of the same photo-album application as used to display the first screen 600 on the first touch screen 190a and at least one image 613 (e.g., images 113 through 124) stored in the storing unit of the application 100 or a folder including the at least one image 613, according to the same photo-album application.

The second screen 610 is one of a plurality of screens that display the at least one image 613 or the folder for providing the same photo-album application as the application displayed on the first screen 600. According to a determined order, the second screen 610 is a screen continuing from the first screen 600 in an ascending sequence. For example, according to a first order, a next screen with respect to the first screen 600, includes an image 113 next to an image 112 displayed last on the first screen 600. The second screen may also be a screen continuing from the first screen 600 in a descending sequence. For example, according to a second order, a previous screen with respect to the first screen 600, includes an image 100 previous to an image 101 displayed first on the first screen 600.

The number of folders or images 613 displayed on the second display area 612 is dependent on the first display area 602. For example, when only the image 101 is displayed on the first display area 602, the image 102 of the first display area 602 according to the first order or the image 100 of the first display area 602 according to the second order, is displayed on the second display area 612. In an embodiment of the present invention, 12 images, images 101 through 112, are displayed on the first display area 602, and 12 images, images 113 through 124, continuing from the image 112 displayed last on the first display area 602 according to the first order, are displayed on the second display area 612.

According to an OS or an application of the device 100, the title bar may not be displayed on the second screen 610. When the title bar is not displayed, the second screen 610 means the second display area 612. According to an OS or an application of the device 100, the status bar 611 may not be displayed on the second touch screen 190b. When the status bar 611 is not displayed, only the second screen 610 may be displayed on the second touch screen 190b.

In step S503 of FIG. 5, it is determined whether a touch is detected on the first touch screen.

Referring to FIG. 6B, a user generates a touch 640 on the first touch screen 190a. The controllers 110 and 110a may detect the touch 640 by using the first touch screen 190a and the touch screen controllers 195 and 195a. The controllers 110 and 110a may receive the first position 640a (e.g., X and Y coordinates) on the first screen 600 corresponding to the touch 640 from the touch screen controllers 195 and 195a. The controllers 110 and 110a may store a touch position on the first touch screen 190a and a touch time at which the touch 640 is detected on the first touch screen 190a in the storing unit. The touch 640 contacting the first touch screen 190a may be generated by, for example, one of fingers or a touch of a touchable object.

In another embodiment of the present invention, the number of touches detected on the first touch screen 190a is not limited to one, and a plurality of touches may be detected. When the plurality of touches are detected on the first touch screen 190a, the controllers 110 and 110a may store a plurality of touch positions and a plurality of touch times at which the plurality of touches are detected in the storing unit. The number of detected touches can be easily understood by those of ordinary skill in the art.

When a touch is not detected on the first touch screen 190a in step S503, the methodology of FIG. 5 proceeds to step S507.

When a touch is detected on the first touch screen 190a in step S503, continuous movement of the touch is detected in step S504.

Referring to FIG. 6B, the controllers 110 and 110a may detect continuous movement (e.g., a plurality of X and Y coordinates corresponding to a continuous touch) of the touch 640 among at least one touches contacting the first touch screen 190a by using the first touch screen 190a and the touch screen controllers 195 and 195a. The continuous movement of the touch may be stored in the storing unit of the device 100. The touch contacting the first touch screen 190a may be a single touch or a plurality of touches.

Continuous movement of a touch (e.g., movement from 640a to 640b) means a part of a continuous touch gesture (e.g., movement from 640a to 640d) of the touch from the first touch screen 190a to the second touch screen 190b. Continuous movement of a touch (e.g., movement from 640c to 640d) means a part of the continuous touch gesture (e.g., movement from 640a to 640d) of the touch from the first touch screen 190a to the second touch screen 190b. Continuous movement of a touch also means that a contact is kept continuous on the first touch screen 190a and the second touch screen 190b, except for in the interval 100d between the first touch screen 190a and the second touch screen 190b. The continuous movement of the touch has non-contact positions in the interval 100d and the last position 640d on the second touch screen 190b.

Referring to FIG. 6B, continuous movement of a touch from the first touch screen 190a to the second touch screen 190b includes, for example, a drag and drop or a flick as touch gestures.

In step S505 of FIG. 5, arrival of the touch on the second touch screen is detected.

Referring to FIG. 6B, the touch starts from the first touch screen 190a, passes through the interval 100d between the first touch screen 190a and the second touch screen 190b, and arrives on the second touch screen 190b. The controllers 110, 110a, and 110b may recognize the last position 640b of the touch on the first touch screen 190a and the first position 640c of the touch arriving on the second touch screen 190b by using the touch screen controllers 195, 195a, and 195b and the storing unit.

The controllers 110, 110a, and 110b may detect arrival of the touch on the second touch screen 190b by using a time at which the touch passes through the interval 100d (e.g., a first time interval), an area determined on the second touch screen 190b, or a direction determined on the second touch screen 190b (e.g., an allowable inclination range).

Figure 7A:
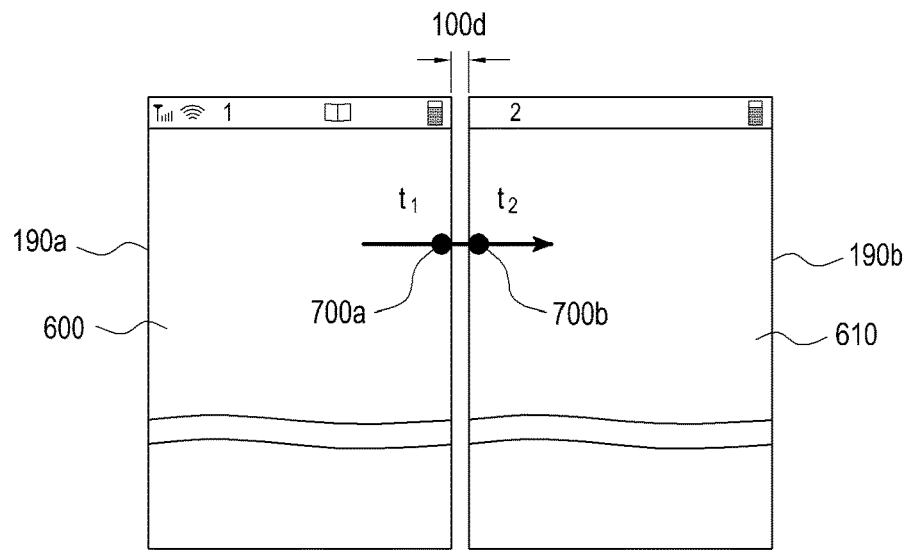
FIGS. 7A through 7C are diagrams illustrating arrival of a continuous touch from a touch screen to another touch screen, according to an embodiment of the present invention.
Figure 7B:
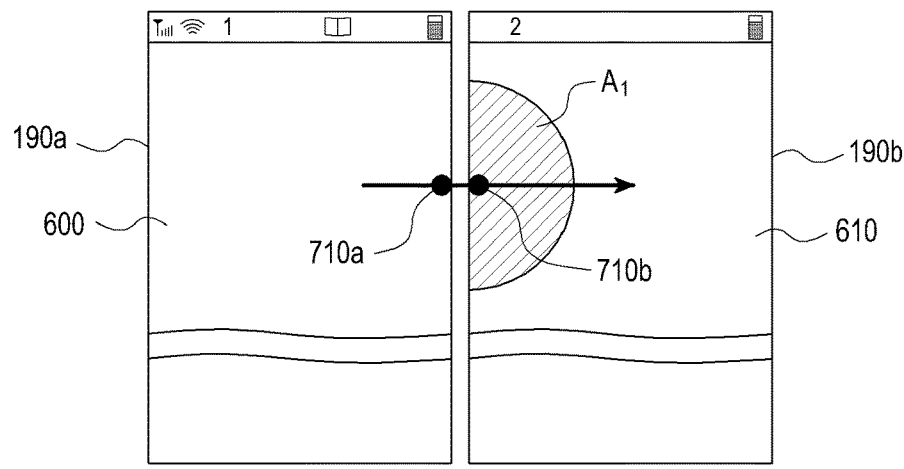
Figure 7C:
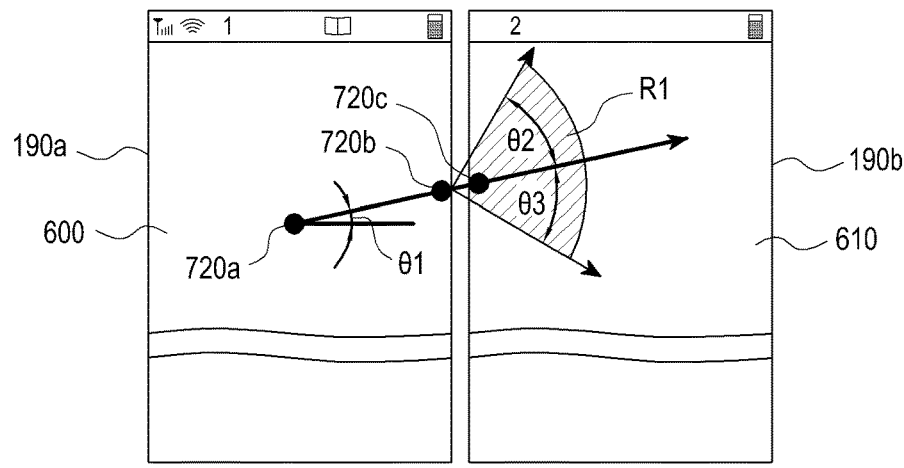

FIGS. 7A through 7C are diagrams illustrating arrival of a continuous touch generated on a touch screen onto another touch screen, according to an embodiment of the present invention.

Referring to FIG. 7A, the controllers 110, 110a, and 110b may detect arrival of a touch on the second touch screen 190b by using a first time interval T1. For example, the first time interval T1 is an interval between a time t1 at the last position 700a of the touch on the first touch screen 190a and a time t2 at the first position 700b of the touch on the second touch screen 190b and is less than 0.5 sec, where the time t1 and the time t2 are stored in the storing unit. According to an embodiment of the present invention, a touch has to arrive on the second touch screen 190b within the first time interval T1.

Referring to FIGS. 11A and 11B, the first time interval T1 may be changed using a Touch Time Interval item 1106a of a Touch Setting item 1106 (e.g., the first time interval T1 may be changed to 0.3 sec).

Referring to FIG. 7B, the controllers 110, 110a, and 110b may detect arrival of a touch on the second touch screen 190b by using a determined area A1. For example, the determined area A1 may be a ½ area of a circle having a radius of 3 cm from a position 710b on the second touch screen 190b extending from the last position 710a on the first touch screen 190a, where the positions 710b and 710a being stored in the storing unit. The determined area A1 is not limited to a circle and may be in a polygonal shape (e.g., an area within a square being 3 cm wide and 2 cm long upward and downward with respect to the first position 710b on the second touch screen 190b). According to an embodiment of the present invention, the touch has to arrive within the determined area A1 on the second touch screen 190b.

Referring to FIGS. 11A and 11B, the determined area A1 may be changed using a Radius of Determined Region item 1106b of the Touch Setting item 1106 (e.g., the radius may be changed to 2 cm).

Referring to FIG. 7C, the controllers 110, 110a, and 110b may detect arrival of a touch on the second touch screen 190b by using an allowable inclination range R1 (e.g., second inclinations θ2 and θ3). A first inclination θ1 of the touch is an inclination of a straight line connecting from the first position 720a to the last position 720b on the first touch screen 190a, where the positions 720a and 720b are stored in the storing unit. When the first inclination θ1 is 15°, the first position 720c of the touch on the second touch screen 190b is in an area between the second inclinations θ2 and θ3 (e.g.,)±45°. For the second inclinations θ2 and θ3 of ±45°, the allowable inclination range R1 means an area between an extended line including a position on the second touch screen 190b corresponding to an inclination θ2 of +45° with respect to the last position 720b of the first touch screen 190a, and an extended line including a position on the second touch screen 190b corresponding to an inclination θ3 of −45° with respect to the last position 720b of the first touch screen 190a. According to an embodiment of the present invention, the touch has to arrive in an area within the allowable inclination range R1 on the second touch screen 190b.

Referring to FIGS. 11A and 11B, the allowable inclination range R1 may be changed using an Allowable Inclination Range item 1106c of the Touch Setting item 1106 (e.g., ±30° with respect to the second inclinations θ2 and θ3).

The controllers 110, 110a, and 110b may provide a feedback responding to arrival 640c of the touch on the second touch screen 190b to the user. The provided feedback may be at least one of a visual feedback, an audible feedback, or a tactile feedback. For example, the controllers 110, 110a, and 110b may provide a combination of a visual feedback, an audible feedback, and a tactile feedback to the user.

The visual feedback may be displayed as a visual effect responding to arrival 640c of the touch on the second touch screen 190b (e.g., a separate image or an animation effect such as fade applied to a separate image), on either the first touch screen 190a or the second touch screen 190b or both. The audible feedback may be output as a sound responding to arrival 640c of the touch on the second touch screen 190b, from either the first speaker 163 or the second speaker 163b or both. The tactile feedback may be output as a vibration responding to arrival 640c of the touch on the second touch screen 190b from the vibration motor 164. At least one feedback may be maintained until arrival of the touch in the last position 640d on the second touch screen 190b.

Referring to FIGS. 11A and 11B, by using a Feedback item 1106e of the Touch Setting item 1106, a time (e.g., 0.5 sec) for which the at least one feedback is provided to the user may be changed. In addition, a feedback provided to the user (e.g., at least one of a visual feedback, an audible feedback, and a tactile feedback) may be selected.

In step S506 of FIG. 5, the first screen and the second screen are changed into other screens among the plurality of screens corresponding to the first order.

Referring to FIG. 6C, the controllers 110, 110a, and 110b change the first screen 600 and the second screen 610 into other screens 615 and 620 among the plurality of screens corresponding to the first order in response to arrival 640c of the touch on the second touch screen 190b. The other screens 615 and 620 display first 2 screens (e.g., images 1 through 12 are displayed on the first touch screen 190a and images 13 through 24 are displayed on the second touch screen 190b) among the plurality of screens which correspond to the first order of the first screen 600 and the second screen 610 and continuous movement of a touch. The changed other screens 615 and 620 maintain the same display format in which 12 images are displayed on each of the first screen 600 and the second screen 610 as before change.

When arrival of the touch on the second touch screen 190b is detected, change of the first screen 600 and the second screen 610 into the other screens 615 and 620 may start. When arrival of the touch on the second touch screen 190b is detected, change of the first screen 600 and the second screen 610 into the other screens 615 and 620 may start after a first delay (e.g., 0.2 sec). Change of the first screen 600 and the second screen 610 into the other screens 615 and 620 may be completed before, upon, or after completion at the last position 640d of the continuous movement of the touch.

Referring to FIGS. 11A and 11B, a screen change time corresponding to change of the first screen 600 and the second screen 610 into the other screens 615 and 620 may be changed using a Screen Change Time item 1106f of the Touch Setting item 1106 (e.g., the first delay of 0.1 sec).

When a first screen 625 and a second screen 630, which are the last 2 screens among the plurality of screens, are displayed on the first touch screen 190a and the second touch screen 190b, respectively, as shown in FIG. 6A, and the touch detected on the second touch screen 190b passes through the interval 100d and arrives on the first touch screen 190a; then the first screen 625 and the second screen 630 are not changed.

When the first screen 625 and the second screen 630, which are the last 2 screens among the plurality of screens, are displayed on the first touch screen 190a and the second touch screen 190b, respectively, as shown in FIG. 6A, and the touch detected on the first touch screen 190a passes through the interval 100d and arrives on another touch screen; then the first screen 625 on the first touch screen 190a and the second screen 630 on the second touch screen 190b may be changed into other screens 615 and 620.

Similarly, when the first screen 615 and the second screen 620, which are the first 2 screens among the plurality of screens, are displayed on the first touch screen 190a and the second touch screen 190b as shown in FIG. 6C, and the touch detected on the first touch screen 190a passes through the interval 100d and arrives on the second touch screen 190b; then the first screen 615 and the second screen 620 are not changed.

When the first screen 615 and the second screen 620, which are the first 2 screens among the plurality of screens, are displayed on the first touch screen 190a and the second touch screen 190b as shown in FIG. 6C, and the touch detected on the second touch screen 190b passes through the interval 100d and arrives on another touch screen; then the first screen 615 on the first touch screen 190a and the second screen 620 on the second touch screen 190b may be changed into other screens 625 and 630.

In another embodiment of the present invention, other screens may be two consecutive screens without being limited to the first or last two screens among the plurality of screens. Referring to FIGS. 11A and 11B, the number of screens changed by continuous movement of a touch may be changed (e.g., one of the first 2 screens, the last 2 screens, two next continuous screens, or two previous continuous screens are selected) using the number of screens changed by the Touch Setting item 1106.

When the first screen 600 and the second screen 610 among the plurality of screens are displayed on the first touch screen 190a and the second touch screen 190b as shown in FIG. 6B, and the touch detected on the first touch screen 190a passes through the interval 100d and arrives on the second touch screen 190b; then they may be changed into two previous screens continuing from the first screen 600 and the second screen 610. The two previous screens may display images 77 through 88 on the first touch screen 190a and images 89 through 100 on the second touch screen 190b.

Similarly, when the first screen 600 and the second screen 610 among the plurality of screens are displayed on the first touch screen 190a and the second touch screen 190b as shown in FIG. 6B, and the touch detected on the second touch screen 190b passes through the interval 100d and arrives on the first touch screen 190a; then they may be changed into two next screens continuing from the first screen 600 and the second screen 610. The two next screens may display images 125 through 136 on the first touch screen 190a and images 137 through 148 on the second touch screen 190b.

In step S506 of FIG. 5, when the controllers 110, 110a, and 110b change the first screen 600 and the second screen 610 into other screens 615 and 620 among the plurality of screens corresponding to the first order, a screen change method for the device 100 having the plurality of touch screens 190a and 190b is ended.

Returning to step S503 of FIG. 5, if a touch is not detected on the first touch screen, it is determined whether a touch is detected on the second touch screen, in step S507.

Referring to FIG. 6B, the user generates a touch 645 on the second touch screen 190b. The controllers 110 and 110b may detect the touch 645 by using the second touch screen 190b and the touch screen controllers 195 and 195b. According to an embodiment of the present invention, the number of touches detected on the second touch screen 190b is not limited to one, and a plurality of touches may be detected. The detecting of the touch in step S507 of FIG. 5 is substantially identical to step S503.

When a touch is not detected on the second touch screen 190b in step S507 of FIG. 5, the screen change method is ended.

When a touch is detected on the second touch screen 109b in step S507, continuous movement of the touch is detected, in step S508.

Referring to FIG. 6B, the controllers 110 and 110b may detect continuous movement of the touch 645 among at least one touch contacting the second touch screen 190b by using the second touch screen 190b and the touch screen controllers 195 and 195b. Continuous movement of the touch 645 may be stored in a storing unit of the device 100. The touch contacting the second touch screen 190b may be a single touch or a plurality of touches. The detecting of continuous movement of a touch in step S508 of FIG. 5 is substantially identical to step S504.

In step S509 of FIG. 5, arrival of the touch on the first touch screen is detected.

Referring to FIG. 6B, the touch starts from the second touch screen 190b, passes through the interval 100d, and then arrives on the first touch screen 190a. The controllers 110, 110a and 110b may recognize the last position 645b of the touch on the second touch screen 190b and the first position 645c at which the touch arrives on the first touch screen 190a, by using the touch screens 190a and 190b and the touch screen controllers 195, 195a, and 195b. The detecting of arrival of the touch 645 on the first touch screen 190a in step S509 is substantially identical to step S505.

The providing of at least one feedback in response to arrival of the touch 645 on the first touch screen 190a is substantially identical to the providing of the at least one feedback in response to arrival of the touch 640 on the second touch screen 190b, as described above.

In step S510 of FIG. 5, the first screen and the second screen are changed into other screens among a plurality of screens corresponding to a second order.

Referring to FIG. 6A, the controllers 110, 110a, and 110b change the first screen 600 and the second screen 610 into other screens 625 and 630 among the plurality of screens corresponding to the second order in response to arrival 645c of the touch 645 on the first touch screen 190a. The other screens 625 and 630 are the last 2 screens among the plurality of screens corresponding to the second order of the first screen 600 and the second screen 610. The changing of the first screen 600 and the second screen 610 into other screens among the plurality of screens in step S510 of FIG. 5 is substantially the same as step S506.

In step S510 of FIG. 5, when the controllers 110, 110a, and 110b change the first screen 600 and the second screen 610 into other screens 625 and 630 among the plurality of screens corresponding to the second order, the change screen method for the device 100 having the plurality of touch screens 190a and 190b is ended.

Referring to FIGS. 6A through 6C, the touch screens 190a and 190b are disposed to the left and to the right with respect to the interval 100d of the device 100, respectively. According to another embodiment of the present invention, the touch screens 190a and 190b of the device 100, which are capable of rotating clockwise or counterclockwise, may be disposed upward or downward from the interval 100d. The rotation of the device 100 may be detected through the sensor module 170. In response to detection by the sensor module 170, the first screen 600 on the first touch screen 190a and the second screen 610 on the second touch screen 190b are rotated.

When the touch screens 190a and 190b are disposed upward or downward from the interval 100d of the device 100, the screen change method for the device 100 is substantially identical to an embodiment in which the touch screens 190a and 190b are disposed to the left or to the right with respect to the interval 100d.

Figure 8:
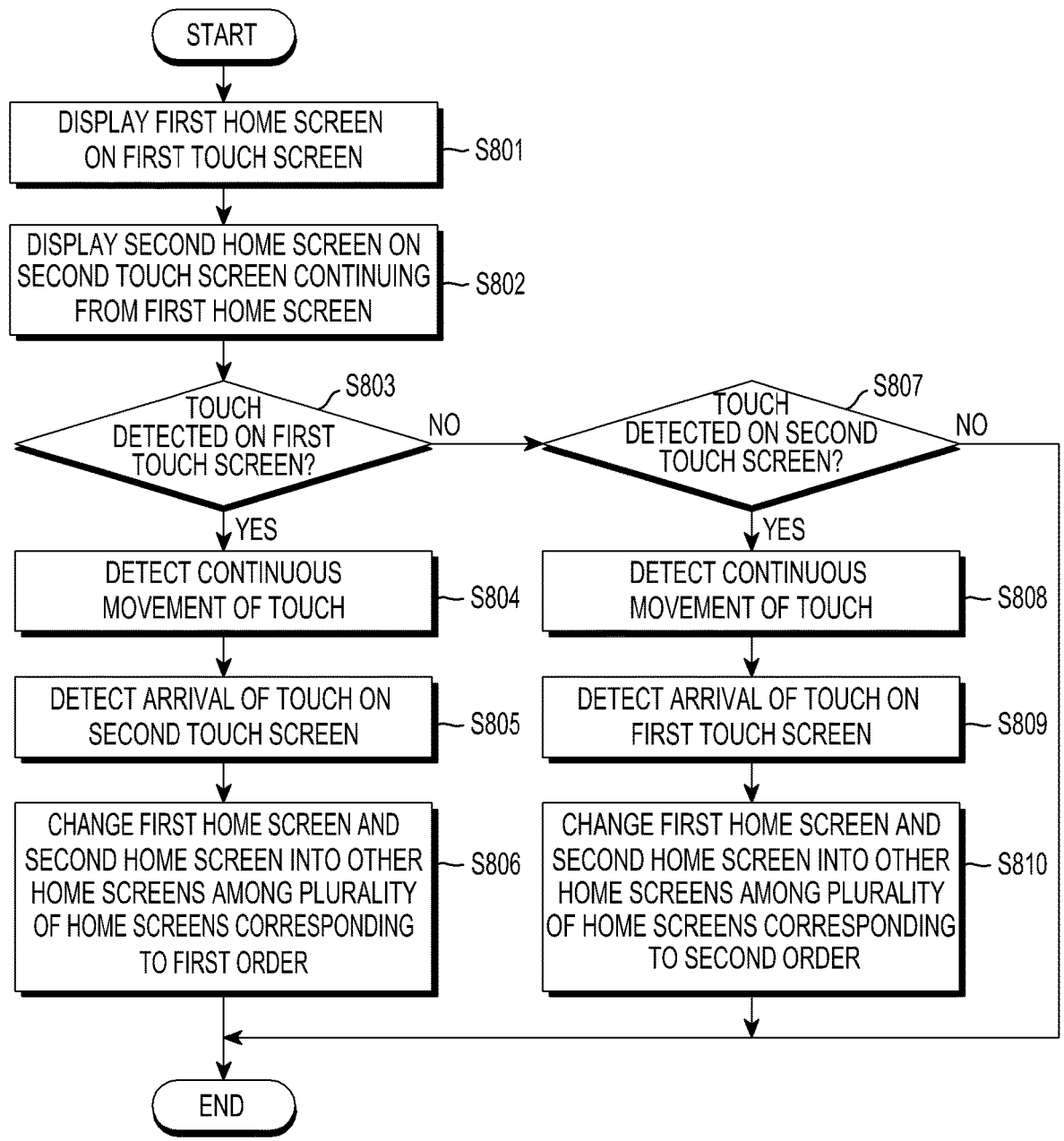
FIG. 8 is a schematic flowchart illustrating a home-screen change method for a device, according to another embodiment of the present invention.

FIG. 8 is a schematic flowchart illustrating a home-screen change method for a device, according to another embodiment of the present invention.

In step S801 of FIG. 8, a first home screen is displayed on a first touch screen.

Figure 9:
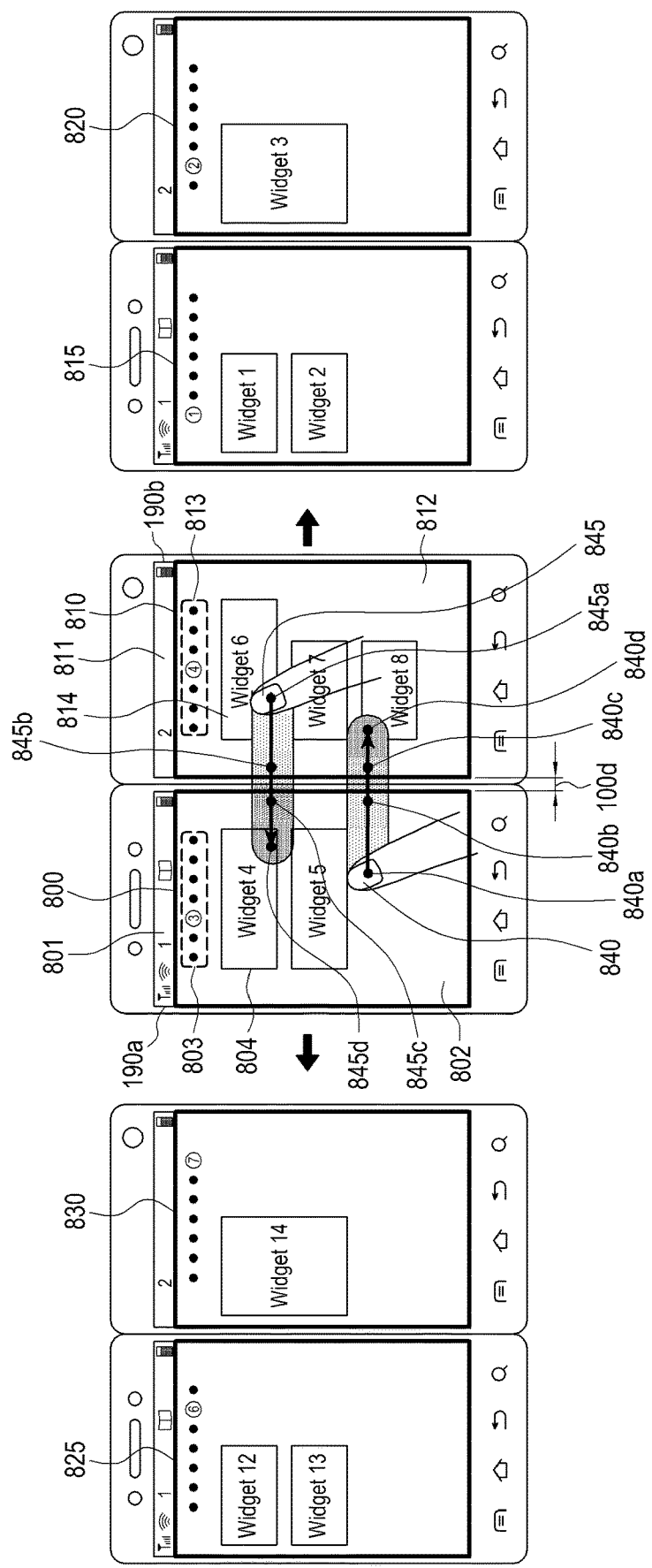
FIGS. 9A through 9C are diagrams illustrating screen change methods for a device, according to another embodiment of the present invention.

FIGS. 9A through 9C a diagrams illustrating a screen change method for a device, according to another embodiment of the present invention.

Referring to FIG. 9B, a first home screen 800 and a status bar 801 are displayed on the first touch screen 190a. The status bar 801 indicates a status of the device 100, such as, for example, a charge status of a battery, a strength of a received signal of a cellular phone, or a dual-mode icon. The dual-mode icon is one of a text and an icon, which indicates whether the plurality of touch screens 190a and 190b of the device 100 operate. The first home screen 800 includes a third display area 802 on which a counter 803 indicating a position of a current home screen, a widget 804, or a short-cut icon is displayed.

The home screen is a standby screen for which a desired item (e.g., a background of the home screen) may be changed by using an Environment Setting 1100, shown in FIG. 11A, or an input set in the device 100 (e.g., a long touch of the home screen) by the user. By using the widget 804 or the short-cut icon displayed on the home screen, various functions may be immediately used. The first home screen 800 is one of a plurality of home screens provided by the device 100.

According to an OS or an application of the device 100, the status bar 801 may not be displayed on the first touch screen 190a. When the status bar 801 is not displayed, only the first home screen 800 may be displayed on the first touch screen 190a.

The plurality of home screens displayed on the touch screens 190a and 190b may correspond to home counters 803 and 813. Referring to the counter 803, the first home screen 800 is the third one among a total of 7 home screens.

In step S802 of FIG. 8, a second home screen continuing from the first home screen is displayed on a second screen.

Referring to FIG. 9B, a second home screen 810 and a status bar 811 indicating a status of the device 100 are displayed on the second touch screen 190b. The second home screen 810 includes a fourth display area 812 on which the counter 813 indicating a position of a current home screen, the widget 814, or a short-cut icon is displayed. The second home screen 810 is one of the plurality of home screens. According to a determined order, the second home screen 810 is a home screen continuing from the first home screen 810 in an ascending sequence (e.g., according to a first order, a next home screen with respect to the first home screen 800) or a home screen continuing from the first home screen 800 in a descending sequence (e.g., according to a second order, a previous home screen with respect to the first home screen 800). Referring to the counter 813, the second home screen 810 is the fourth one among the total of 7 home screens.

According to an OS or an application of the device 100, the status bar 811 may not be displayed on the second home screen 810. When the status bar 811 is not displayed, only the second home screen 810 may be displayed on the second touch screen 190b.

In step S803 of FIG. 8, it is determined whether a touch is detected on a first touch screen.

Referring to FIG. 8B, the user generates a touch 840 on the first touch screen 190a. The controllers 110 and 110a may detect the touch 840 by using the first touch screen 190a and the touch screen controllers 195 and 195a. The controllers 110 and 110a may receive the first position 840a (e.g., X and Y coordinates) on the first home screen 800 corresponding to the touch 840 from the touch screen controllers 195 and 195a. The controllers 110 and 110a may store a touch position on the first touch screen 190a and a touch time at which the touch 840 is detected on the first touch screen 190a in the storing unit. The touch 840 contacting the first touch screen 190a may be generated by, for example, one of the user's fingers or a touch of a touchable object.

In another embodiment of the present invention, the number of touches detected on the first touch screen 190a is not limited to one, and a plurality of touches may be detected. When the plurality of touches are detected on the first touch screen 190a, the controllers 110 and 110a may store a plurality of touch positions and a plurality of touch times at which the plurality of touches are detected in the storing unit. The number of detected touches can be easily understood by those of ordinary skill in the art.

When a touch is not detected on the first touch screen 190a in step S803, the methodology proceeds to step S807.

However, when a touch is detected on the first touch screen 190a, continuous movement of the touch is detected, in step S804.

Referring to FIG. 9B, the controllers 110 and 110a may detect continuous movement (e.g., a plurality of X and Y coordinates corresponding to a continuous touch) of a touch among at least one touches contacting the first touch screen 190a by using the first touch screen 190a and the touch screen controllers 195 and 195a. The continuous movement of the touch may be stored in the storing unit of the device 100. The touch contacting the first touch screen 190a may be a single touch or a plurality of touches.

Continuous movement of a touch (e.g., movement from 840a to 840b) means a part of a continuous touch gesture (e.g., movement from 840a to 840d) of the touch from the first touch screen 190a to the second touch screen 190b. Continuous movement of a touch (e.g., movement from 840c to 840d) means a part of the continuous touch gesture (e.g., movement from 840a to 840d) of the touch from the first touch screen 190a to the second touch screen 190b. Continuous movement of a touch also means that a contact is kept continuous on the first touch screen 190a and the second touch screen 190b, except for in the interval 100d between the first touch screen 190a and the second touch screen 190b. The continuous movement of the touch has non-contact positions in the interval 100d and the last position 840d on the second touch screen 190b.

Referring to FIG. 9B, continuous movement of a touch from the first touch screen 190a to the second touch screen 190b includes, for example, drag and drop or flick touch gestures.

In step S805 of FIG. 8, arrival of the touch on the second touch screen is detected.

Referring to FIG. 8B, the touch starts from the first touch screen 190a, passes through the interval 100d between the first touch screen 190a and the second touch screen 190b, and arrives on the second touch screen 190b. The controllers 110, 110a, and 110b may recognize the last position 840b of the touch on the first touch screen 190a and the first position 840c of the touch arriving on the second touch screen 190b by using the touch screens 190a and 190b and the touch screen controllers 195, 195a, and 195b.

The controllers 110, 110a, and 110b may detect arrival of the touch on the second touch screen 190b by using a time at which the touch passes through the interval 100d (e.g., a second time interval), an area determined on the second touch screen 190b, or a direction determined on the second touch screen 190b (e.g., an allowable inclination range).

FIGS. 7A through 7C are diagrams illustrating arrival of a continuous touch generated on a touch screen onto another touch screen, according to embodiments of the present invention, and as described above with respect to FIGS. 5 and 6A.

The controllers 110, 110a, and 110b may provide a feedback responding to arrival 840c of the touch on the second touch screen 190b to the user. The provided feedback may be at least one of a visual feedback, an audible feedback, or a tactile feedback, as described above with respect to FIGS. 5 and 6A. For example, the controllers 110, 110a, and 110b may provide a combination of a visual feedback, an audible feedback, and a tactile feedback to the user.

In step S806 of FIG. 8, the first home screen and the second home screen are changed into other home screens among the plurality of home screens corresponding to the first order.

Referring to FIG. 9C, the controllers 110, 110a, and 110b change the first home screen 800 and the second home screen 810 into other home screens 815 and 820 among the plurality of home screens corresponding to the first order, in response to arrival 840c of the touch on the second touch screen 190b. The other home screens 815 and 820 display the first 2 home screens (e.g., '1' is displayed on the counter 803 of the first touch screen 190a and '2' is displayed on the counter 813 of the second touch screen 190b) among the plurality of screens which correspond to the first order of the first home screen 800 and the second home screen 810 and continuous movement of a touch.

When arrival of the touch on the second touch screen 190b is detected, change of the first home screen 800 and the second home screen 810 into the other home screens 815 and 820 may start. When arrival of the touch on the second touch screen 190b is detected, change of the first home screen 800 and the second home screen 810 into the other home screens 815 and 820 may start after a second delay (e.g., 0.2 sec). Change of the first home screen 800 and the second home screen 810 into the other home screens 815 and 820 may be completed before, upon, or after completion at the last position 840d of the continuous movement of the touch.

Referring to FIGS. 11A and 11B, a screen change time corresponding to change of the first home screen 800 and the second home screen 810 into the other home screens 815 and 820 may be changed using the Screen Change Time item 1106f of Touch Setting item 1106 (e.g., the second delay of 0.3 sec).

In step S806 of FIG. 8, the controllers 110, 110a, and 110b change the first home screen 800 and the second home screen 810 into other home screens 815 and 820 among the plurality of screens corresponding to the first order, and a screen change method for the device 100 having the plurality of touch screens 190a and 190b is ended.

Returning to step S803 of FIG. 8, if a touch is not detected on the first touch screen, it is determined whether a touch is detected on the second touch screen in step S807.

Referring to FIG. 9B, the user generates a touch 845 on the second touch screen 190b. The controllers 110 and 110b may detect the touch 845 by using the second touch screen 190b and the touch screen controllers 195 and 195b. According to an embodiment of the present invention, the number of touches detected on the first touch screen 190a is not limited to one, and a plurality of touches may be detected. The detecting of the touch in step S807 of FIG. 8 is substantially identical to step S803.

When a touch is not detected on the second touch screen 190b in step S807 of FIG. 8, the screen change method is ended.

In step S808 of FIG. 8, continuous movement of the touch is detected.

Referring to FIG. 9B, the controllers 110 and 110b may detect continuous movement of the touch 845 among at least one touch contacting the second touch screen 190b by using the second touch screen 190b and the touch screen controllers 195 and 195b. Continuous movement of the touch may be stored in a storing unit of the device 100. The touch contacting the second touch screen 190b may be a single touch or a plurality of touches. The detecting of continuous movement of a touch in step S808 in FIG. 8 is substantially identical to step S804.

In step S809 of FIG. 8, arrival of the touch on the first touch screen is detected.

Referring to FIG. 9B, the touch starts from the second touch screen 190b, passes through the interval 100d, and then arrives on the first touch screen 190a. The controllers 110, 110a and 110b may recognize the last position 845b of the touch on the second touch screen 190b and the first position 845c at which the touch arrives on the first touch screen 190a, by using the touch screens 190a and 190b and the touch screen controllers 195, 195a, and 195b. The detecting of arrival of the touch 845 on the first touch screen 190a in step S809 of FIG. 8 is substantially identical to step S805.

The providing of at least one feedback in response to arrival of the touch on the first touch screen 190a is substantially the same as in steps S505 and S805.

In step S810 of FIG. 8, the first screen and the second screen are changed into other screens among a plurality of screens corresponding to a second order.

Referring to FIG. 9A, the controllers 110, 110a, and 110b change the first home screen 800 and the second home screen 810 into other screens 825 and 830 among the plurality of screens corresponding to the second order in response to arrival of the touch 845c on the first touch screen 190a. For the other screens 825 and 830, the last 2 home screens among the plurality of screens corresponding to the second order of the first home screen 800 and the second home screen 810 are displayed on the first touch screen 190a and the second touch screen 190b. The changing of the first home screen 800 and the second home screen 810 into other home screens among the plurality of screens in step S810 of FIG. 8 is substantially identical to step S806.

In step S810 of FIG. 8, when the controllers 110, 110a, and 110b change the first home screen 800 and the second home screen 810 into other home screens 825 and 830 among the plurality of screens corresponding to the second order, the change screen method for the device 100 having the plurality of touch screens 190a and 190b is ended.

Referring to FIGS. 9A through 9C, the touch screens 190a and 190b are disposed to the left and to the right with respect to the interval 100d of the device 100, respectively. According to another embodiment of the present invention, the touch screens 190a and 190b of the device 100 capable of rotating clockwise or counterclockwise may be disposed upward or downward from the interval 100d, as described above with respect to FIGS. 6A through 6C.

Figure 10:
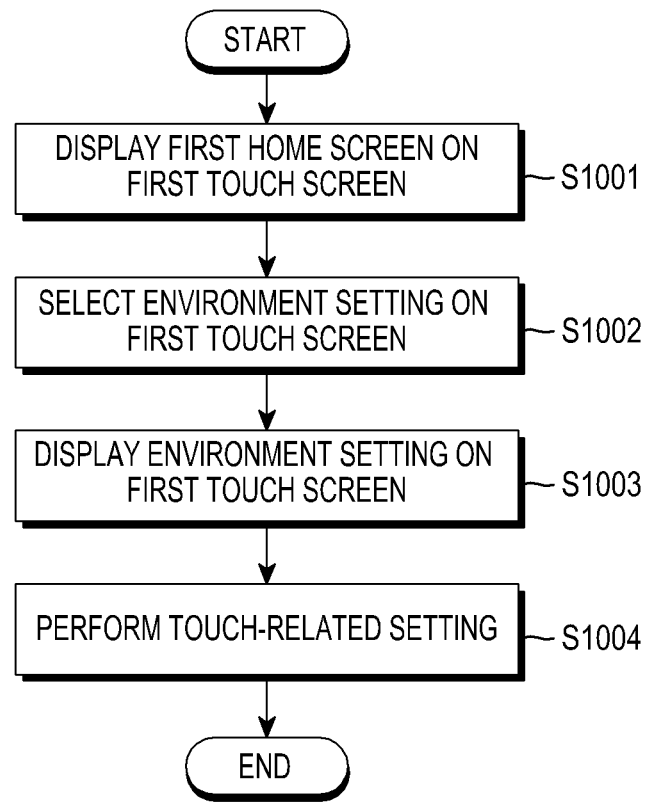
FIG. 10 is a schematic flowchart illustrating touch setting, according to an embodiment of the present invention.

FIG. 10 is a schematic flowchart illustrating touch setting, according to an embodiment of the present invention.

In step S1001 of FIG. 10, a home screen is displayed on a first touch screen or a second touch screen. If a user selects the home button 161a2 of the first button group 161a of the first housing 100a, a home screen is displayed on the first touch screen 190a. If the user selects the home button 161b2 of the second button group 161b of the second housing 100b, a home screen is displayed on the second touch screen 190b. The present invention will be described using an example in which the home screen is displayed by selecting the home button 161a2 of the first touch screen 190a.

In step S1002 of FIG. 10, an environment setting is selected on the first touch screen.

On the home screen displayed on the first touch screen 190a, an environment setting may be selected by the user by using a short-cut icon corresponding to the environment setting. Alternatively, when the home screen is displayed, the menu button 161a1 is selected by the user and the environment setting is selected.

In step S1003 of FIG. 10, the environment setting is displayed.

FIG. 11A is a diagram illustrating a touch setting, according to an embodiment of the present invention.

Referring to FIG. 11A, under control of the controllers 110 and 110a, the Environment Setting 1100 is displayed on the first touch screen 190a. Displayed items of the Environment Setting 1100 include a Wireless Network item 1101, a Call item 1102, a Sound item 1103, a Display item 1104, a Security item 1105, and the Touch Setting item 1106. According to the capability of the device 100, some items may be added to or removed from the displayed items of the Environment Setting 1100.

In step S1004 of FIG. 10, a touch-related setting is performed.

FIG. 11B is a diagram illustrating a touch setting, according to an embodiment of the present invention.

When the Touch Setting item 1106 is selected in FIG. 11A, the Touch Setting item 1106 is displayed as shown in FIG. 11B.

Referring to FIG. 11B, the Touch Setting item 1106 may include at least one of the Touch Time Interval item 1106a corresponding to the first time interval of 0.3 sec, the Radius of Determined Area item 1106b of the determined area having a radius of 3 cm, the Allowable Inclination Range item 1106c of a touch corresponding to the second inclinations θ2 and θ3 of ±45°, a Touch Gesture Change item 1106d for changing a touch gesture corresponding to screen change or home-screen change from flick to spread, the Feedback item 1106e selected between a visual feedback and a tactile feedback, and the Screen Change Time item 1106f having a screen change time of 0.5 sec. According to the capability supported by the device 100, some items may be added to or removed from the items of the Touch Setting item 1106.

The touch-related setting is performed in step S1004 of FIG. 10, and the methodology is ended.

According to embodiments of the present invention, in response to continuous movement of a touch starting from the first touch screen to the second touch screen among the plurality of touch screens, the first screen and the second screen, which correspond to the same application and continue from each other among the plurality of screens, can be changed into other continuous screens.

Moreover, in response to continuous movement of a touch starting from the first touch screen to the second touch screen among the plurality of touch screens, the first home screen and the second home screen, which continue from each other among the plurality of home screens, can be changed into other continuous home screens.

In addition, in response to arrival of continuous movement of a touch starting from the first touch screen onto the second touch screen, at least one of the visual feedback, the audible feedback, and the tactile feedback can be provided to the user.

Furthermore, a touch gesture corresponding to continuous movement of a touch from the first touch screen to the second touch screen among the plurality of touch screens may be changed.

Methods according to embodiment of the present invention may be embodied as program commands, which can be executed through various computer means, and may be recorded on a computer-readable medium. Examples of the computer-readable medium may include a program command, a data file, and a data structure alone or in combination. The program command recorded on the medium may be specially designed or configured for embodiments of the present invention or may be well known to and used by those of ordinary skill in the computer software field.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for displaying data by a device having a plurality of touch screens, the method comprising:
    displaying a first screen on a first touch screen;
    displaying a second screen on a second touch screen, wherein the second screen is a next screen of the first screen, the first screen and the second screen are included in a middle of a plurality of screens arranged in a predetermined order, at least one screen exists between the second screen and a last two screens in the predetermined order, and at least one screen exists between the first screen and a first two screens in the predetermined order;
    in response to detecting a predefined scroll input, scrolling the plurality of screens in the predetermined order based on a movement direction of the predefined scroll input, wherein the predefined scroll input is continuously inputted, from a starting point included in one of the first touch screen and the second touch screen, to an end point of a touch screen other than a touch screen including the starting point; and
    displaying the last two screens or the first two screens, based on the movement direction of the predefined scroll input.

2. The method of claim 1, wherein displaying the last two screens, or the first two screens comprises:
    in response to the predefined scroll input being inputted from the start point of the second touch screen to the end point of the first touch screen, displaying the last two screens; or
    in response to the predefined scroll input being inputted from the start point of the first touch screen to the end point of the second touch screen, displaying the first two screens.

3. The method of claim 1, further comprising:
    in response to arriving at the end point of the predefined scroll input, providing an audible feedback; and
    maintaining the audible feedback until the predefined scroll input is removed.

4. The method of claim 3, wherein arrival of the predefined scroll input is detected by using a time at which, an area in which, or a direction in which the predefined scroll input is detected.

5. A method for displaying a home screen by a device having a plurality of touch screens, the method comprising:
    displaying a first home screen on a first touch screen, and displaying a second home screen on a second touch screen, wherein the second home screen is a next home screen of the first home screen, the first home screen and the second home screen are included in a middle of a plurality of home screens arranged in a predetermined order, at least one home screen exists between the second home screen and a last two home screens in the predetermined order, and at least one home screen exists between the first home screen and a first two home screens in the predetermined order;
    in response to detecting a predefined scroll input scrolling the plurality of home screens, scrolling the plurality of home screens in the predetermined order based on a movement direction of the predefined scroll input, wherein the predefined scroll input is continuously inputted from a starting point included in one of the first touch screen and the second touch screen, to an end point of a touch screen other than a touch screen including the starting point; and
    displaying the last two home screens or the first two home screens, based on the movement direction of the predefined scroll input.

6. The method of claim 5, wherein displaying the last two home screens, or the first two home screens comprises:
    in response to the predefined scroll input being inputted from the start point of the second touch screen to the end point of the first touch screen, displaying the last two home screens; or
    in response to the predefined scroll input being inputted from the start point of the first touch screen to the end point of the second touch screen, displaying the first two home screens.

7. The method of claim 5, further comprising:
    in response to arriving at the end point of the predefined scroll input, providing an audible feedback; and
    maintaining the audible feedback until the predefined scroll input is removed.

8. The method of claim 7, wherein arrival of the predefined scroll input is detected by using a time at which, an area in which, or a direction in which the predefined scroll input is detected.

9. A device for displaying data, comprising:
    a first touch screen;
    a second touch screen; and
    a processor configured to:
        display a first screen on the first touch screen, and display a second screen on the second touch screen, wherein the second screen is a next screen of the first screen, the first screen and the second screen are included in a middle of a plurality of screens arranged in a predetermined order, at least one screen exists between the second screen and a last two screens in the predetermined order, and at least one screen exists between the first screen and a first two screens in the predetermined order;
        in response to detecting a predefined scroll input, scroll the plurality of screens in the predetermined order based on a movement direction of the predefined scroll input, wherein the predefined scroll input is continuously inputted, from a starting point included in one of the first touch screen and the second touch screen, to an end point of a touch screen other than a touch screen including the starting point; and display the last two screens or the first two screens, based on the movement direction of the predefined scroll input.

10. The device of claim 9, wherein the processor is further configured to:
in response to the predefined scroll input being inputted from the start point of the second touch screen to the end point of the first touch screen, control the first touch screen and the second touch screen to display the last two screens; or
in response to the predefined scroll input being inputted from the start point of the first touch screen to the end point of the second touch screen, control the first touch screen and the second touch screen to display the first two screens.

11. The device of claim 9, wherein the processor is further configured to:
in response to arriving at the end point of the predefined scroll input, provide an audible feedback or a tactile feedback; and
maintain the audible feedback until the predefined scroll input is removed.

12. A device for displaying a home screen, comprising:
a first touch screen;
a second touch screen;
a processor configured to:
display a first home screen on the first touch screen, and display a second home screen on the second touch screen, wherein the second home screen is a next home screen of the first home screen, the first home screen and the second home screen are included in a middle of a plurality of home screens arranged in a predetermined order, at least one home screen exists between the second home screen and a last two home screens in the predetermined order, and at least one home screen exists between the first home screen and a first two home screens in the predetermined order,
in response to detecting a predefined scroll input, scroll the plurality of home screens in the predetermined order based on a movement direction of the predefined scroll input, wherein the predefined scroll input is continuously inputted, from a starting point included in one of the first touch screen and the second touch screen, to an end point of a touch screen other than a touch screen included the starting point; and
display the last two home screens or the first two home screens, based on the movement direction of the predefined scroll input.

13. The device of claim 12, wherein the processor is further configured to:
in response to the predefined scroll input being inputted from the start point of the second touch screen to the end point of the first touch screen, control the first touch screen and the second touch screen to display the last two home screens; or
in response to the predefined scroll input being inputted from the start point of the first touch screen to the end point of the second touch screen, control the first touch screen and the second touch screen to display the first two home screens.

14. The device of claim 12, wherein the processor is further configured to:
in response to arriving at the end point of the predefined scroll input, provide an audible feedback or a tactile feedback; and
maintain the audible feedback until the predefined scroll input is removed.

* * * * *